(12) United States Patent
Liang et al.

(10) Patent No.: US 7,741,397 B2
(45) Date of Patent: *Jun. 22, 2010

(54) FILLED POLYMER COMPOSITIONS MADE FROM INTERPOLYMERS OF ETHYLENE/α-OLEFINS AND USES THEREOF

(75) Inventors: Wenbin Liang, Sugar Land, TX (US); Yunwa W. Cheung, Lake Jackson, TX (US); Charles F. Diehl, Lake Jackson, TX (US); Kyle G. Kummer, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 1023 days.

This patent is subject to a terminal disclaimer.

(21) Appl. No.: 11/376,833

(22) Filed: Mar. 15, 2006

(65) Prior Publication Data

US 2006/0199887 A1 Sep. 7, 2006

Related U.S. Application Data

(63) Continuation-in-part of application No. PCT/US2005/008917, filed on Mar. 17, 2005.

(60) Provisional application No. 60/717,587, filed on Sep. 16, 2005, provisional application No. 60/553,906, filed on Mar. 17, 2004.

(51) Int. Cl.
C08K 3/30 (2006.01)
(52) U.S. Cl. .............. 524/423; 524/543; 524/428; 524/425; 524/445; 524/451; 524/494; 524/493; 524/435; 524/502; 524/515
(58) Field of Classification Search ........... 524/423, 524/543, 428, 425, 445, 451, 494, 493, 435, 524/502, 515
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,873,642 A | 3/1975 | Jezi | |
| 4,146,492 A | 3/1979 | Cusano et al. | |
| 4,299,931 A | 11/1981 | Coran et al. | |
| 4,429,079 A | 1/1984 | Shibata et al. | |
| 4,510,031 A | 4/1985 | Matsumura et al. | |
| 4,668,752 A | 5/1987 | Tominari et al. | |
| 4,780,228 A | 10/1988 | Gardiner et al. | |
| 4,798,081 A | 1/1989 | Hazlitt et al. | |
| 5,068,047 A | 11/1991 | Chung et al. | |
| 5,266,626 A | 11/1993 | Hert et al. | |
| 5,322,728 A | 6/1994 | Davey et al. | |
| 5,391,629 A | 2/1995 | Turner et al. | |
| 5,468,810 A | 11/1995 | Hayakawa et al. | |
| 5,476,914 A | 12/1995 | Ewen et al. | |
| 5,594,080 A | 1/1997 | Waymouth et al. | |
| 5,597,881 A | 1/1997 | Winter et al. | |
| 5,610,253 A | 3/1997 | Hatke et al. | |
| 5,624,991 A | 4/1997 | Harada et al. | |
| 5,733,980 A | 3/1998 | Cozewith et al. | |
| 5,783,531 A | 7/1998 | Andrew et al. | |
| 5,798,420 A | 8/1998 | Cozewith et al. | |
| 5,868,984 A | 2/1999 | Winter et al. | |
| 5,892,076 A | 4/1999 | Nickias | |
| 5,916,953 A * | 6/1999 | Jacoby et al. ............ 524/494 |
| 5,969,070 A | 10/1999 | Waymouth et al. | |
| 5,994,255 A | 11/1999 | Nickias et al. | |
| 6,008,262 A | 12/1999 | McKay et al. | |
| 6,025,448 A | 2/2000 | Swindoll et al. | |
| 6,096,668 A | 8/2000 | Abuto et al. | |
| 6,114,457 A | 9/2000 | Markel et al. | |
| 6,121,402 A | 9/2000 | Machida et al. | |
| 6,124,400 A | 9/2000 | Chien | |
| 6,136,937 A | 10/2000 | Lai et al. | |
| 6,147,180 A | 11/2000 | Markel et al. | |
| 6,160,029 A | 12/2000 | Chaudhary et al. | |
| 6,187,424 B1 | 2/2001 | Kjellqvist et al. | |
| 6,197,404 B1 | 3/2001 | Varona | |
| 6,262,203 B1 | 7/2001 | Chien et al. | |
| 6,362,252 B1 * | 3/2002 | Prutkin ............ 523/200 |

(Continued)

FOREIGN PATENT DOCUMENTS

EP 0 274 906 A2 7/1988

(Continued)

OTHER PUBLICATIONS

International Search Report (PCT/US2006/009411), dated Aug. 8, 2007.

(Continued)

*Primary Examiner*—Robert D. Harlan
(74) *Attorney, Agent, or Firm*—Whyte Hirschboeck Dudek SC

(57) ABSTRACT

A filled polymer composition comprises (i) an ethylene/α-olefin interpolymer, and (ii) a filler. The ethylene/α-olefin interpolymer is a block copolymer having at least a hard block and at least a soft block. The soft block comprises a higher amount of comonomers than the hard block. The block interpolymer has a number of unique characteristics disclosed here. The filled polymer compositions provided herein, in certain embodiments, have relatively higher heat resistance and improved noise, vibration and harshness properties and can be used in automotive floorings, roofings, wire and cable coating applications.

58 Claims, 25 Drawing Sheets

U.S. PATENT DOCUMENTS

| | | |
|---|---|---|
| 6,455,638 B2 | 9/2002 | Laughner et al. |
| 6,537,472 B2 | 3/2003 | Masubuchi |
| 6,566,446 B1 | 5/2003 | Parikh et al. |
| 6,566,544 B1 | 5/2003 | Waymouth et al. |
| 6,815,023 B1 | 11/2004 | Tatarka et al. |
| 7,005,395 B2 | 2/2006 | Zafiroglu et al. |
| 2003/0027954 A1 | 2/2003 | Becke et al. |
| 2003/0096896 A1 | 5/2003 | Wang et al. |
| 2003/0194575 A1 | 10/2003 | Tau et al. |
| 2003/0195128 A1 | 10/2003 | Deckman et al. |
| 2003/0216518 A1 | 11/2003 | Tau et al. |
| 2004/0082750 A1 | 4/2004 | Tau et al. |
| 2004/0092662 A1 | 5/2004 | Goto et al. |
| 2004/0121922 A1 | 6/2004 | Okada et al. |
| 2004/0158011 A1 | 8/2004 | Jain et al. |
| 2004/0192147 A1 | 9/2004 | Smith et al. |
| 2005/0009993 A1 | 1/2005 | Morioka et al. |
| 2006/0030667 A1 | 2/2006 | Yalvac et al. |
| 2008/0299857 A1 | 12/2008 | Harding et al. |

FOREIGN PATENT DOCUMENTS

| | | |
|---|---|---|
| EP | 0 877 050 | 11/1998 |
| EP | 1 026 184 | 8/2000 |
| EP | 1 097 976 A2 | 5/2001 |
| EP | 0 958 313 B1 | 9/2002 |
| EP | 1 262 498 A2 | 12/2002 |
| EP | 1 588 843 A1 | 10/2005 |
| EP | 1375585 A1 | 10/2005 |
| JP | 2002-206007 A | 7/2002 |
| JP | 2003-147158 A | 5/2003 |
| JP | 2004-168876 A | 6/2004 |
| JP | 2004-204058 | 7/2004 |
| JP | 2004-204058 A | 7/2004 |
| WO | WO 95/27745 A1 | 10/1995 |
| WO | WO 95/27746 A1 | 10/1995 |
| WO | 96/12762 A1 | 5/1996 |
| WO | 97/12919 A1 | 4/1997 |
| WO | WO 98/34970 A1 | 8/1998 |
| WO | WO 99/35171 A1 | 7/1999 |
| WO | WO 00/37514 A1 | 6/2000 |
| WO | WO 00/69930 A1 | 11/2000 |
| WO | WO 02/066540 A2 | 8/2002 |
| WO | WO 02/079322 | 10/2002 |
| WO | WO 03/014046 A1 | 2/2003 |
| WO | WO 2005/090425 A1 | 9/2005 |
| WO | WO 2005/090426 A1 | 9/2005 |
| WO | WO 2005/090427 A1 | 9/2005 |

OTHER PUBLICATIONS

Nitta et al., Polymer, 41(18), 2000, 6765-6771.

* cited by examiner

US 7,741,397 B2

FILLED POLYMER COMPOSITIONS MADE FROM INTERPOLYMERS OF ETHYLENE/α-OLEFINS AND USES THEREOF

CROSS-REFERENCE TO RELATED APPLICATIONS

This application claims priority to U.S. Provisional Application No. 60/717,587, filed Sep. 16, 2005, which application further claims priority to PCT Application No. PCT/US2005/008917, filed on Mar. 17, 2005, which claims priority to U.S. Provisional Application No. 60/553,906, filed Mar. 17, 2004. For purposes of United States patent practice, the contents of the provisional applications and the PCT application are herein incorporated by reference in their entirety.

FIELD OF THE INVENTION

The invention relates to filled polymer compositions comprising an ethylene/α-olefin interpolymer and filler, methods of making the filled polymer compositions and products made therefrom.

BACKGROUND OF THE INVENTION

Composites of filled thermoplastic compositions with sound deadening properties are well known for use in automotive applications. The thermoplastic compositions typically comprise a polymer, a plasticizer and a filler. A number of patents have been granted for such highly filled thermoplastic compositions as represented by U.S. Pat. Nos. 4,191,798; 4,222,924; 4,263,196; 4,379,190; 4,403,007; 4,430,468; 4,434,258; and 4,438,228. Different systems of polymers, plasticizers and fillers have been proposed for sound deadening applications in automotive flooring. For example, the above-mentioned patents disclose the use of ethylene interpolymers such as ethylene/vinyl ester, ethylene/unsaturated mono- or di-carboxylic acids, or esters of unsaturated acids, etc. Blends of such ethylene interpolymers with other elastomers and polymers have also been proposed in these applications. Further, various filled polyethylene copolymer, polyvinyl chloride, ethylene-propylene-diene compositions are used for applications in wire and cable.

Notwithstanding the proposal of many different polymer based filled compositions for use in sound-deadening composites and other applications, ethylene vinyl acetate (EVA) has been most widely used on a commercial basis. There is practical limit for addition of fillers such as the more commonly employed medium-density fillers, e.g., $CaCO_3$, bauxite, gypsum, etc. As the filler levels rise above a certain point, other properties suffer, such as melt index (as it drops, extruder pressures mount rapidly), softness (the "hand" becomes much stiffer), and elongation (which drops alarmingly). Ultimately, it is not possible to compound binary $EVA/CaCO_3$ blends as the mixture will no longer "flux" in a Banbury Mixer (the charge merely stirs—the resin will not "work" as the blades turn, no power rise ensues, the mixture on discharge is still discrete EVA pellets in a powdery Whiting mass). If one were to use a very dense filler, such as $BaSO_4$, slightly more filler can be added to binary EVA blends. However, there is a demand for improved materials which meet a number of balanced properties such as impact strength, tensile, elongation, flex modulus, heat resistance and specific gravity. In addition, where the sound-deadening composition or composite is used in certain applications such as automotive flooring, a number of other requirements have been specified by automobile manufacturers. For example, automotive materials or parts must satisfy requirements of resistance to cold, mildew, fogging and flammability.

Thus, there is a need for other materials that have improved noise, vibration and harshness dampening properties, increased heat resistance, and low modulus for use in flooring for automotive, cable and wire and roofing members.

SUMMARY OF THE INVENTION

The aforementioned needs are met by various aspects of the invention. In certain embodiments, provided herein is a filled polymer composition comprising a polymer and a filler. The polymer for use in the compositions comprises an ethylene/α-olefin interpolymer that a) has a Mw/Mn from about 1.7 to about 3.5, at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1; or (f) at least a molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (g) an average block index greater than zero and up to about 1.0 and a molecular weight distribution, Mw/Mn, greater than about 1.3.

In one embodiment, the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm \geq 858.91 - 1825.3(d) + 1112.8(d)^2.$$

In another embodiment, the ethylene/α-olefin interpolymer has a Mw/Mn from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In one embodiment, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d).$$

In another embodiment, the numerical values of Re and d satisfy the following relationship: Re>1491−1629(d), Re>1501−1629(d) or Re>1511−1629(d).

In some embodiments, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In some embodiments, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In one embodiment, the filled polymer composition provided herein comprises α-olefin selected from propylene, 1-butene, 1-pentene, 1-hexene, 1-octene or a combination thereof.

In another embodiment, the ethylene/α-olefin interpolymer used in the filled compositions provided herein has a melt index in the range from about 0.1 to about 2000 g/10 minutes measured according to ASTM D-1238, Condition 190° C./2.16 kg. In certain embodiments, the melt index is in the range from about 1 to about 1500, about 2 to about 1000, about 5 to about 500, 0.3 to about 10 g/10 minutes measured according to ASTM D-1238, Condition 190° C./2.16 kg. In certain embodiments, the ethylene/α-olefin interpolymer has a melt index of about 1 g/10 minutes, about 3 g/10 minutes or about 5 g/10 minutes measured according to ASTM D-1238, Condition 190° C./2.16 kg.

In one embodiment, the ethylene/α-olefin interpolymer in the filled polymer compositions provided herein is present in a range from about 5% to about 70%, from about 10% to about 50% or from about 20% to about 30% by total weight of the composition. In certain embodiments, the ethylene/α-olefin interpolymer is present in about 50%, about 30% or about 12% of the total weight of the composition.

In another embodiment, the filled polymer composition provided herein comprises a filler selected from calcium carbonate, barium sulfate, aluminum hydroxide, magnesium hydroxide, glass fibers, nano-clays, talc, carbon black, graphite, flyash, cement dust, clay, feldspar, nepheline, silica or glass, fumed silica, alumina, magnesium oxide, zinc oxide, aluminum silicate, calcium silicate, titanium dioxide, titanates, glass microspheres and chalk. In some embodiments, the filler is selected from aluminum hydroxide and magnesium hydroxide. In other embodiments, the filler is selected from calcium carbonate and barium sulfate. In certain embodiments, the filler is calcium carbonate.

In one embodiment, the filler is present in a range from about 30% to about 95% by total weight of the composition. In another embodiment, the filler is present in a range from about 40% to about 90%, from about 45% to about 85% or from about 50% to about 85% by total weight of the composition. In some embodiments, the filler is about 80% by total weight of the composition.

In some embodiments, the polymer for use in the filled polymer compositions provided herein is a blend of ethylene/α-olefin copolymers. In other embodiments, the filled polymer compositions provided herein further comprise a second polymer. Exemplary second polymers for use herein include, but are not limited to polyethylene, polypropylene, polyvinyl chloride, ethylene-propylene copolymer, a (ethylene-co-vinyl acetate), a terpolymer of ethylene, propylene, a nonconjugated diene, a mixed polymer of ethylene and vinyl acetate, a styrene-butadiene mixed polymer and a combination thereof.

In some embodiments, the filled polymer compositions provided herein comprise at least a plasticizer. The plasticizer for use herein include, but are not limited to a processing oil, an epoxidized oil, a polyester, a polyether, a polyether ester or a combination thereof. In one embodiment, the plasticizer comprises a processing oil, such as paraffinic processing oil, aromatic processing oil, naphthenic processing oil or a combination thereof. In other embodiments, the plasticizer comprises paraffinic processing oil. In some embodiments, the plasticizer comprises paraffinic processing oil and stearic acid. In some embodiments, the plasticizer is present in an amount from about 1% up to about 15%, about 1% up to about 10%, about 1% up to about 9%, about 2% up to about 8%, about 3% up to about 7% or about 4% up to about 6% by total weight of the composition. In other embodiments, the plasticizer is a present in less than about 1% by total weight of the composition.

In one embodiment, the filled polymer composition further comprises an additive, such as an anti-blocking agent, an antioxidant, a UV stabilizer, a colorant, a cross-linking agent, a flame retardant, an antistatic agent, or a combination thereof.

The compositions provided herein are used in preparing a sound deadening article, an automotive carpet, a roofing material, a wire or cable coating, a floor tile, a floor sheet, a profile, a gasket or a floor mat.

Also provided are methods of making an article, comprising blending the ethylene/α-olefin interpolymer with a filler as described herein.

Additional aspects of the invention and characteristics and properties of various embodiments of the invention will become apparent with the following description.

BRIEF DESCRIPTION OF THE DRAWINGS

In FIGS. 9-22:
"01" corresponds to Example 24,
"03" corresponds to Example 25,
"05" corresponds to Example 26,
"02" corresponds to Control 5,
"04" corresponds to Control 6,
"06" corresponds to Control 7,
"07" corresponds to Control 6a,
"08" corresponds to Control 8,
"09" corresponds to Control 9,
"10" corresponds to Example 27 and
"11" corresponds to Control 10.

DETAILED DESCRIPTION OF THE INVENTION

General Definitions

Figure 1:
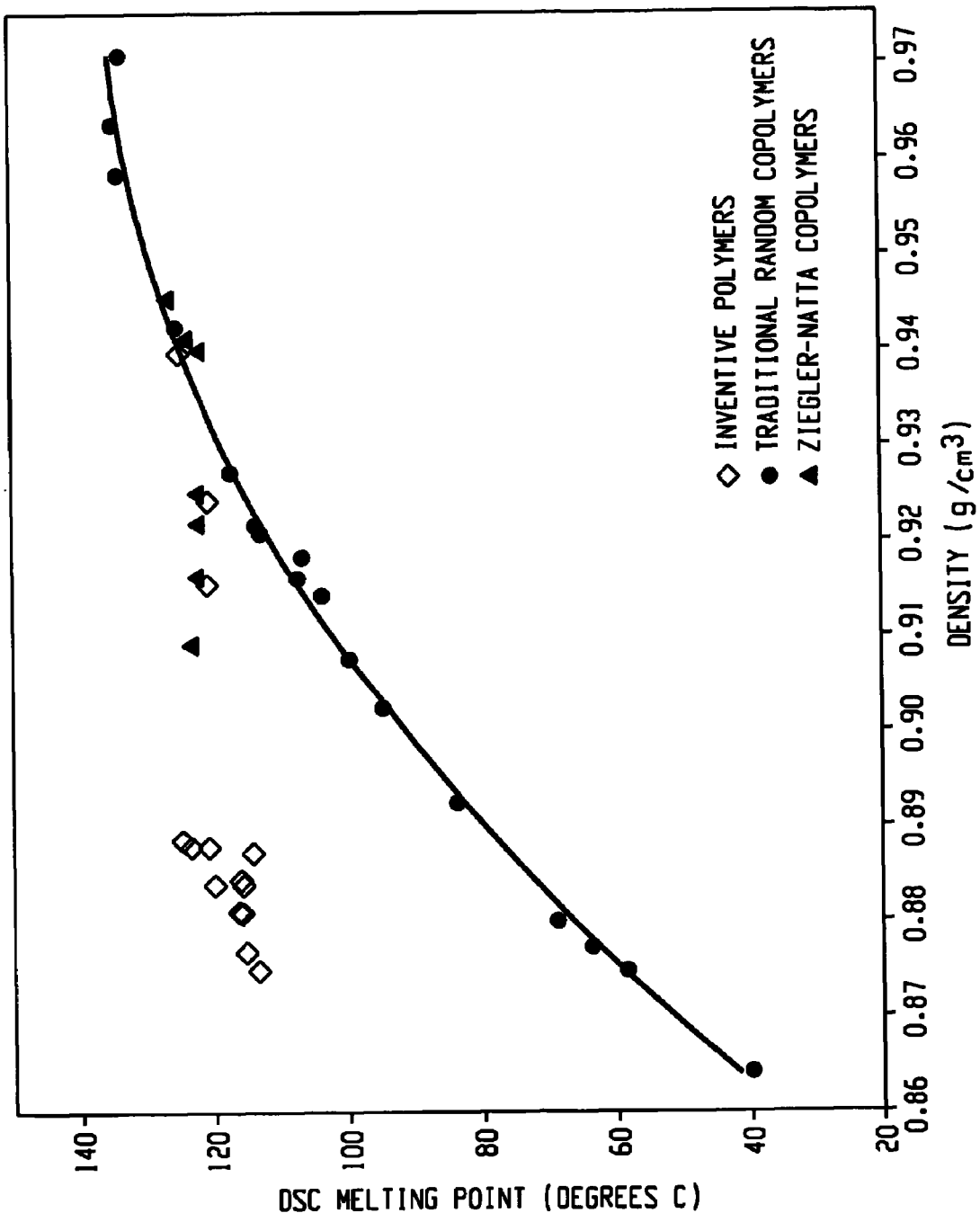
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer containing two or more chemically distinct regions or segments (referred to as "blocks") preferably joined in a linear manner, that is, a polymer having chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process for making the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, RL and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Filled Polymer Compositions

Provided herein are filled polymer compositions that have the desired noise, vibration and harshness improvement properties. The filled polymer compositions provided herein comprise:

A. a polymer which is an ethylene/α-olefin interpolymer, and

B. a filler.

In certain embodiments, the compositions further comprise: C. a plasticizer and optionally D. an additive. The filled polymer compositions provided herein possess unique physical properties, such as higher heat resistance, better flexibility, and improvement in heat resistance-low modulus balance that make them suitable for use in variety of applications in noise vibration and harshness improvement, in automotive flooring and rooftops, in cable and wire.

Furthermore, compared to traditional polyolefin copolymers and blends, the ethylene/α-olefin interpolymers and blends provided herein exhibit higher crystallization temperatures. The ethylene/α-olefin interpolymer compositions provided herein exhibit higher green strength at relatively higher temperature compared with traditional random copolymer compositions, which will allow higher set-up temperatures, shorter set-up time and thus allow faster production rate in injection molding, calendaring, thermoforming, and other similar types of operations. The higher crystallization temperature of the ethylene/α-olefin interpolymers will yield lower shrinkage relative to the random copolymers.

Component A: Polymer

Ethylene/α-olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2,\text{ and preferably}$$

$$T_m \geq -6288.1 + 13141(d) - 6720.3(d)^2,\text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
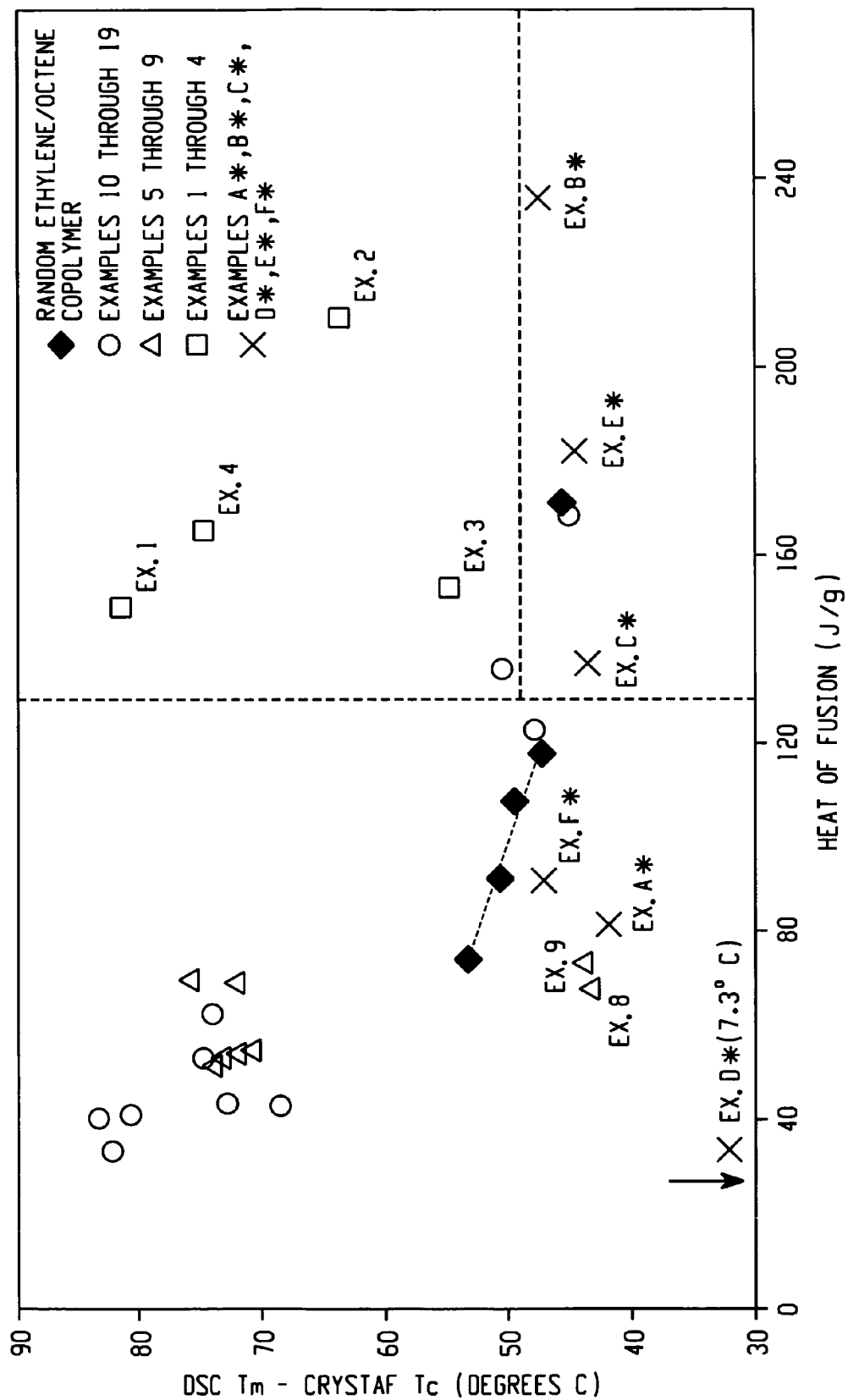
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299(ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
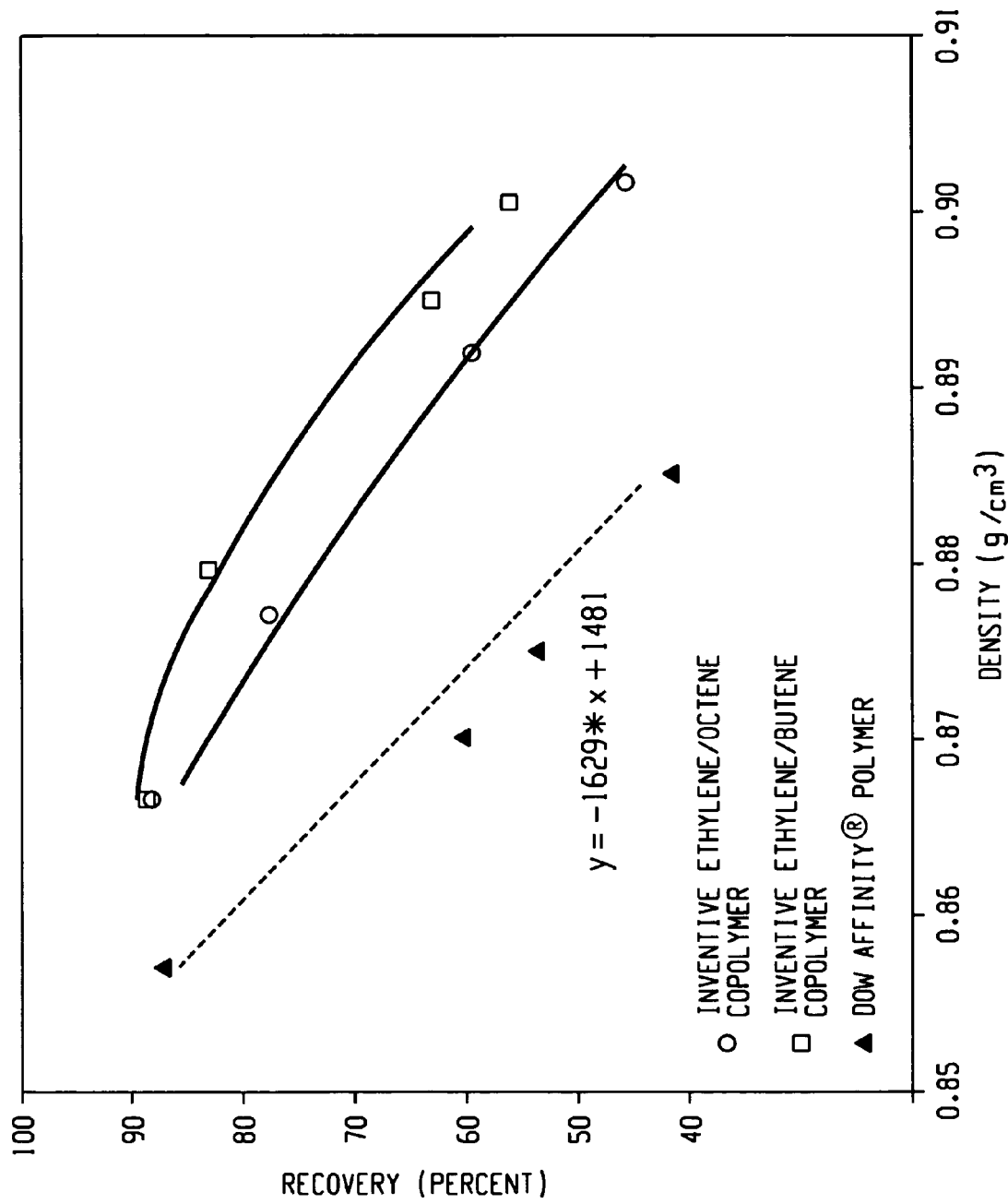
FIG. 3 shows the effect of density on elastic recovery for unoriented films made from inventive interpolymers(represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot² (4800 Pa), preferably equal to or less than 50 lbs/ft² (2400 Pa), especially equal to or less than 5 lbs/ft² (240 Pa), and as low as 0 lbs/ft² (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity $(-0.2013)T+20.07$, more preferably greater than or equal to the quantity $(-0.2013)T+21.07$, where T is the numerical value of the peak elution temperature of the TREF fraction being compared, measured in ° C.

Figure 4:
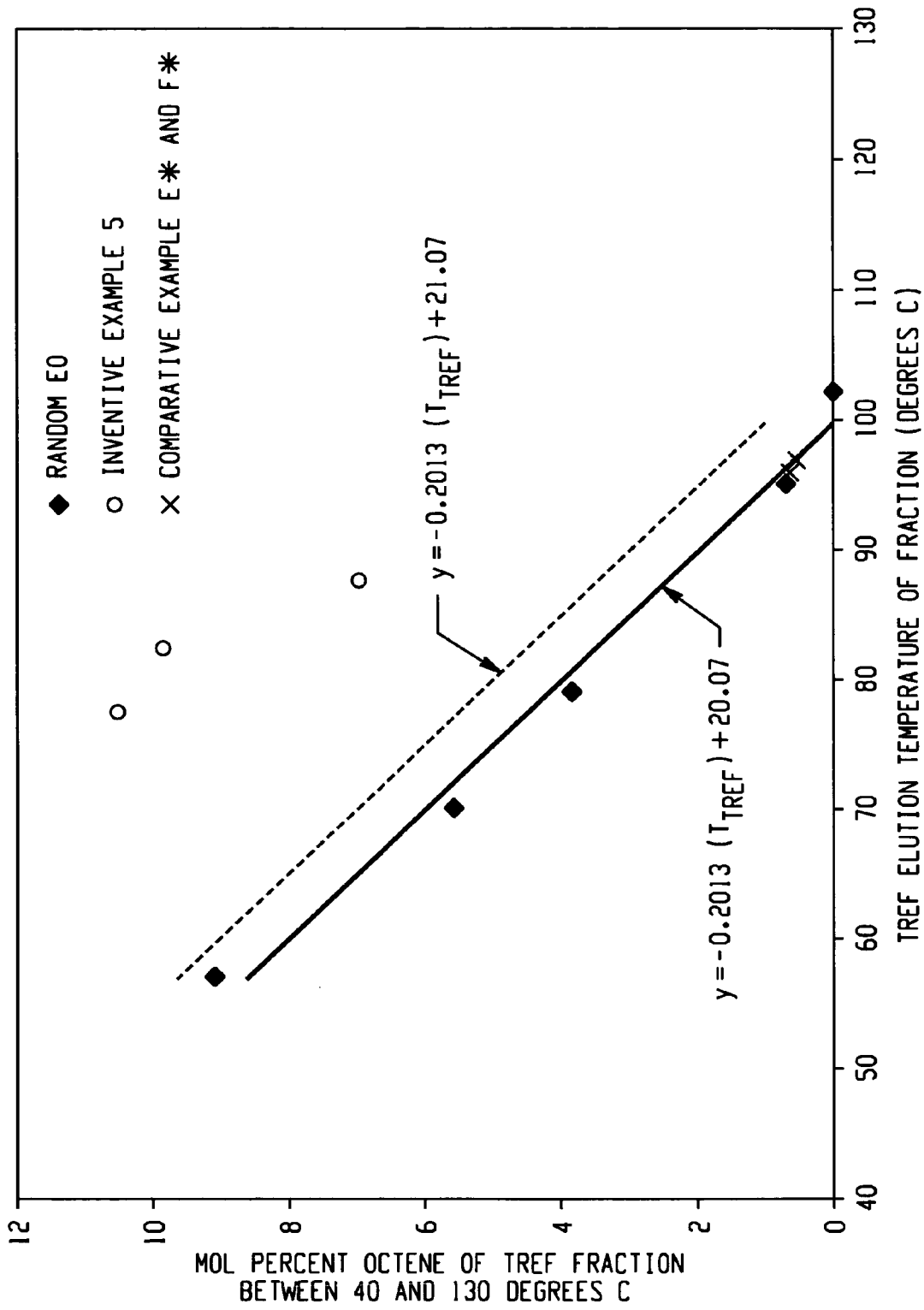
FIG. 4 is a plot of octene content of TREF fractionated ethylene/1-octene copolymer fractions versus TREF elution temperature of the fraction for the polymer of Example 5 (represented by the circles) and Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing $(-0.2013)T+20.07$ (solid line). The line for the equation $(-0.2013)T+21.07$ is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
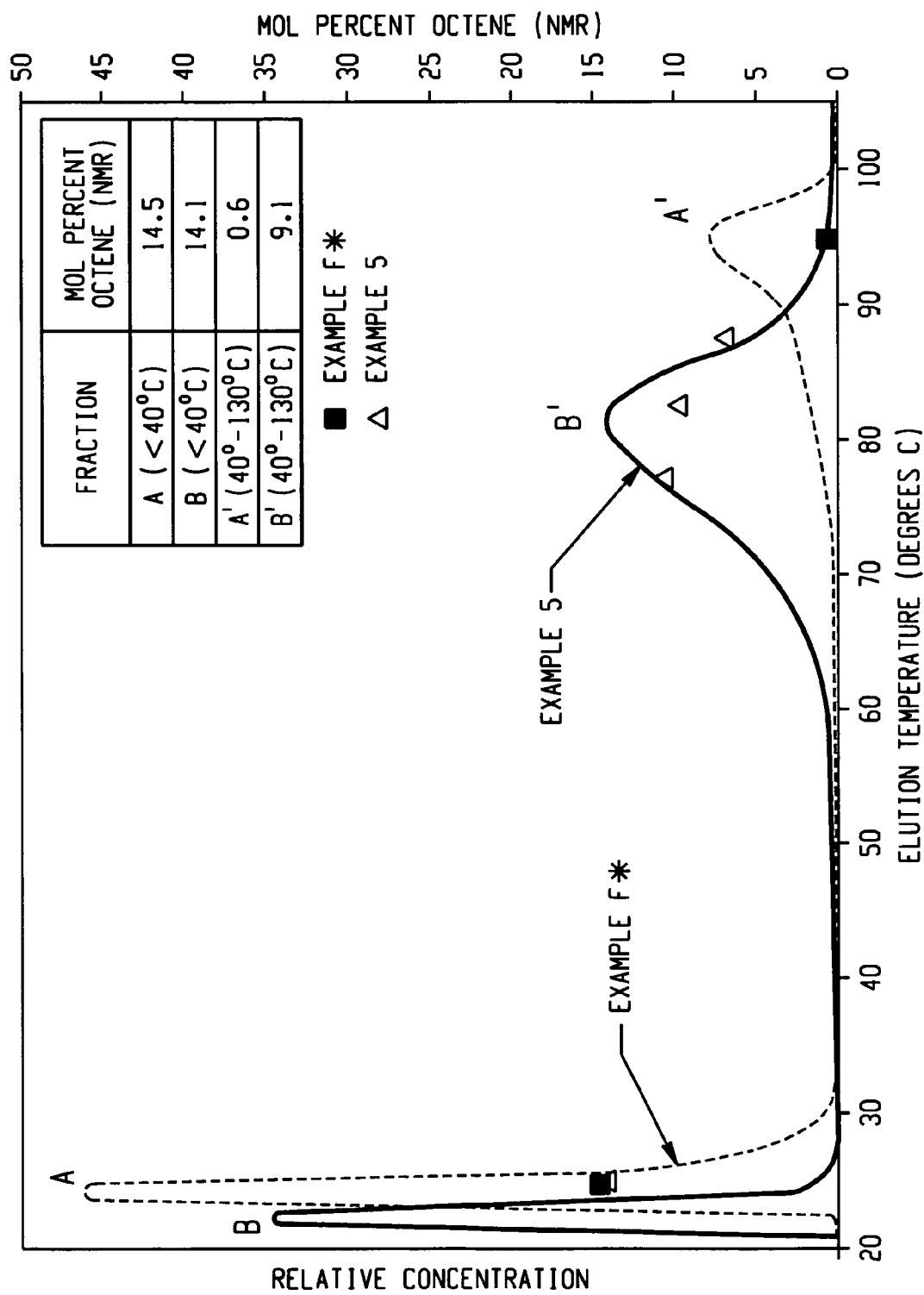
FIG. 5 is a plot of octene content of TREF fractionated ethylene/1-octene copolymer fractions versus TREF elution temperature of the fraction for the polymer of Example 5 (curve 1) and for Comparative Examples F* (curve 2). The squares represent Example F*; and the triangles represent Example 5.

FIG. 5 graphically displays the TREF curve and comonomer contents of polymer fractions for Example 5 and Comparative Example F* to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.1356)T+13.89$, more preferably greater than or equal to the quantity $(-0.1356)T+14.93$, and most preferably greater than or equal to the quantity $(-0.2013)T+21.07$, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.2013)T+20.07$, more preferably greater than or equal to the quantity $(-0.2013)T+21.07$, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ΔTREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the preparative ATREF elution temperature for the ith fraction (preferably expressed in Kelvin), $P_x$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$\text{Ln}P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln\ P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$ greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than –25° C., more preferably less than –30° C., and/or (5) one and only one $T_m$.

Figure 6:
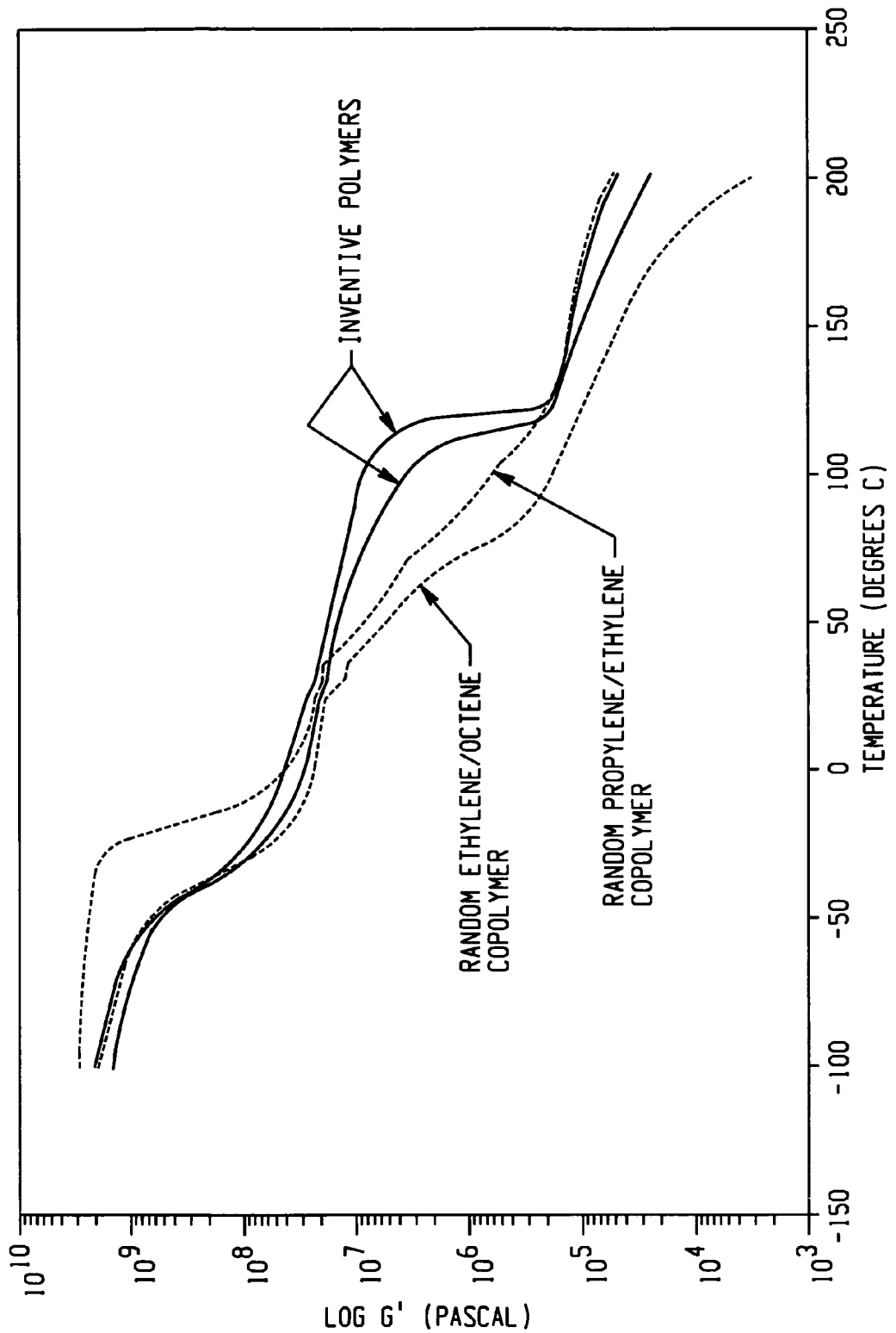
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
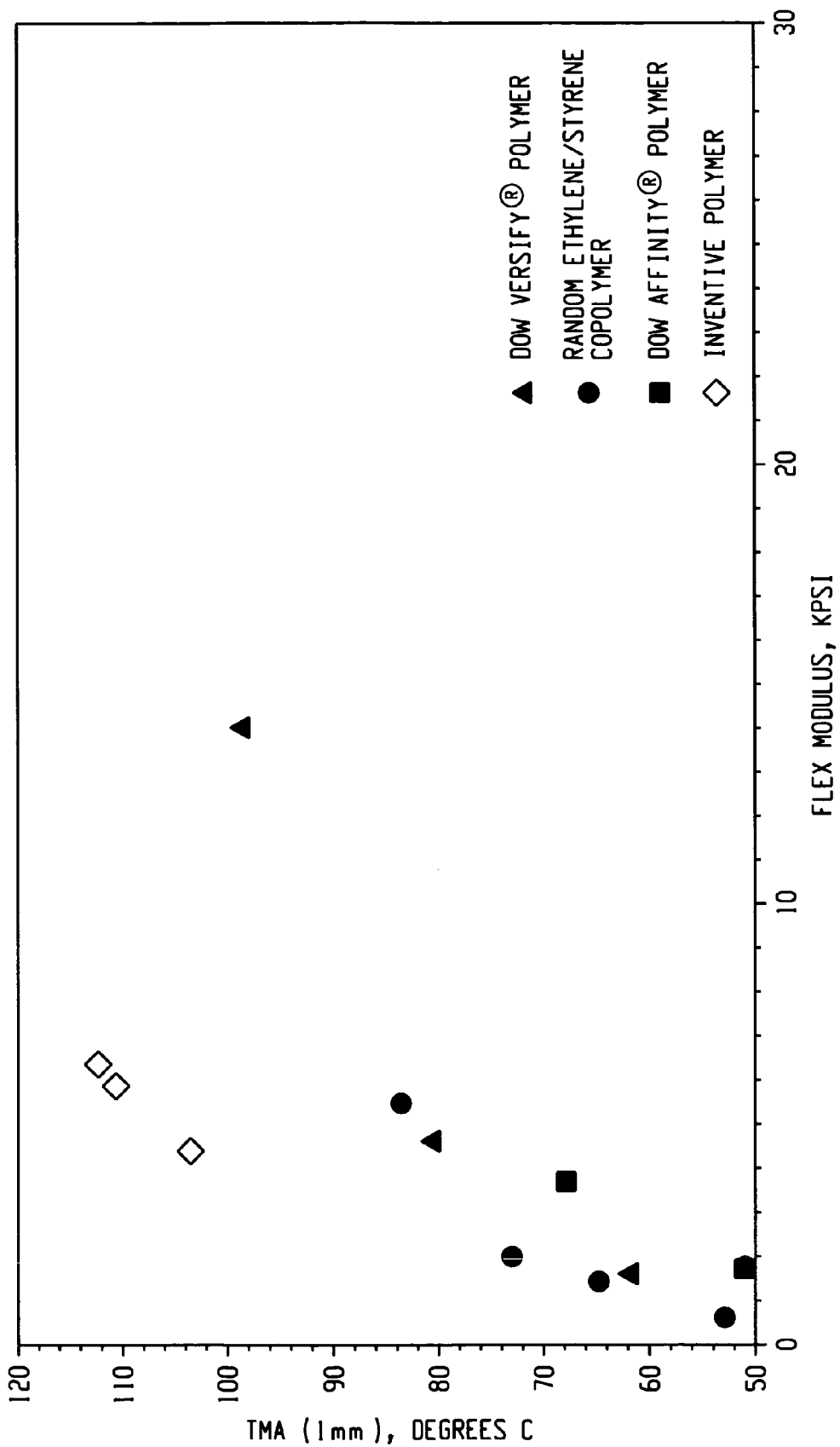
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 $mm^3$. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 $g/cm^3$ and preferably for ethylene containing polymers from 0.85 $g/cm^3$ to 0.97 $g/cm^3$. In certain embodiments, the density of the ethylene/α-olefin polymers ranges from 0.860 to 0.925 $g/cm^3$ or 0.867 to 0.910 $g/cm^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

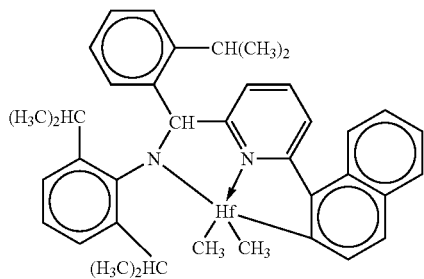

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

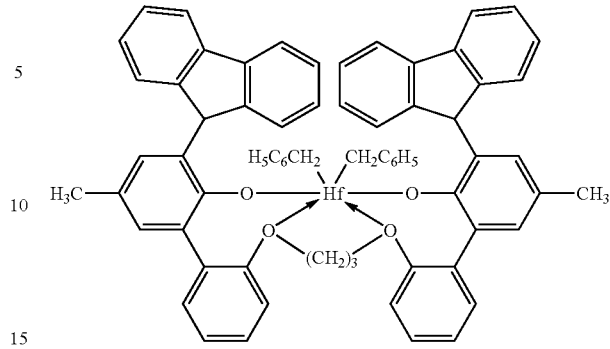

Catalyst (B1) is 1,2-bis-(3,5-di-t-butylphenylene)(1-(N-(1-methylethyl)imino)methyl)(2-oxoyl) zirconium dibenzyl

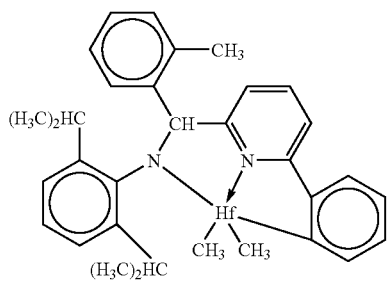

Catalyst (A3) is bis[N,N'''-(2,4,6-tri(methylphenyl)amido)ethylenediamine]hafnium dibenzyl.

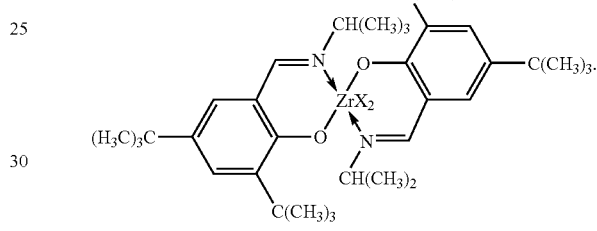

Catalyst (B2) is 1,2-bis-(3,5-di-t-butylphenylene)(1-(N-(2-methylcyclohexyl)-imino)methyl)(2-oxoyl) zirconium dibenzyl

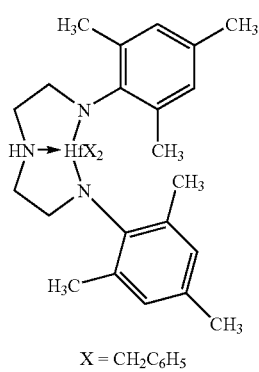

X = $CH_2C_6H_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

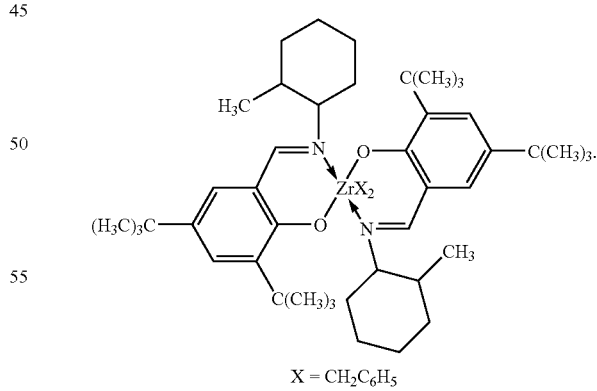

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

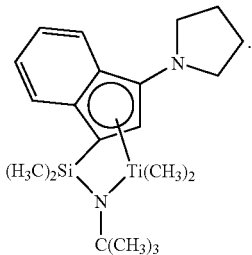

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

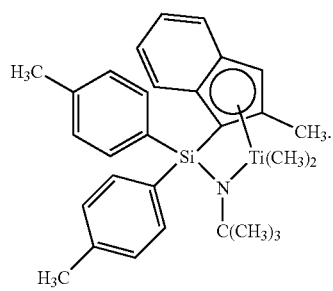

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

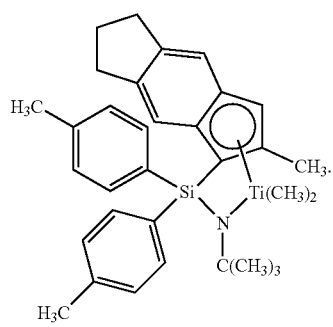

Catalyst (D1) is bis(dimethyldisiloxane)(indene-1-yl)zirconium dichloride available from Sigma-Aldrich:

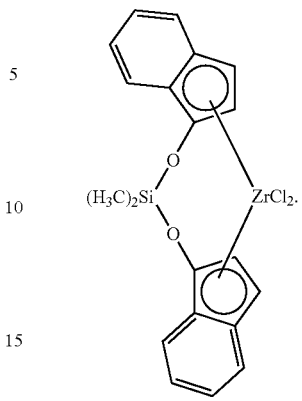

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

In certain embodiments, the filled compositions provided herein comprise a blend of ethylene/α-olefin interpolymers of differing molecular weight and/or overall density. The ethylene/α-olefin interpolymer is present in an amount ranging from about 5% up to about 70% by total weight of the filled polymer composition. In certain embodiments, the amount of ethylene/α-olefin interpolymer ranges from about 5% up to about 60%, from about 10% up to about 50%, from about 15% up to about 40%, from about 20% up to about 30% by total weight of the filled polymer composition. In certain embodiments, the ethylene/α-olefin interpolymer is present in about 60%, 55%, 50%, 45%, 40%, 35%, 30%, 25%, 20%, 15%, 12%, 10%, or 5% by total weight of the composition.

Other Polymers

In certain embodiments, the polymer for use in the filled polymer compositions provided herein is a blend of an ethylene/α-olefin interpolymer and other polymers known in the art for use in the filled polymer compositions for improvement of noise, vibration and harshness and for use in the wire, cable and roofing applications. Such polymers (also referred to as "other polymers" or "second polymer(s)") include, but are not limited to polyolefin resins; such as polyethylene and polypropylene; ethylene copolymers, such as ethylene-propylene copolymer and poly(ethylene-co-vinyl acetate); terpolymers of ethylene, propylene and a nonconjugated diene (EPMD); polyvinyl chloride (PVC); mixed polymers of ethylene and vinyl acetate (EVA); styrene-butadiene mixed polymers (SBR); and mixtures of these materials with thermoplastic polymers, such as polystyrene and polyolefins; metallocene copolymers, substantially linear olefin polymers described in U.S. Pat. Nos. 5,272,236 and 5,278,272, the disclosures of which are incorporated herein by reference. The amount of other polymers in the filled polymer compositions provided herein can range from about 0% up to about 70%, about 5% up to about 60%, about 10% up to about 50%, about 15% up to about 45%, about 20% up to about 40%, about 30% up to about 40% of the total weight polymer present in the composition. In certain embodiments, the amount of the other polymers in the composition is about 5%, 10%, 15%, 20%, 25%, 30%, 35%, 40%, 50%, 60% or 70% of the total weight of the polymer.

Component B: Filler

A filler is used in the filled polymer compositions, for example, to provide mass which contributes to sound-deadening or other desirable properties. The filled polymer compositions provided herein are able to maintain desirable fabrication characteristics with high filler levels. The attainment of filler loadings of approximately 50 percent by volume, and above, while maintaining adequate mechanical properties is favorable to the formulation of economical compositions, and results in compositions particularly useful for sound management applications. Further, the compositions provided herein, in certain embodiments, can maintain desirable mechanical properties over a wide range of filler levels.

Fillers which are useful in the compositions include, but are not limited to calcium carbonate, barium sulfate, talc, carbon black or graphite, flyash, cement dust, clay, feldspar, nepheline, silica or glass, fumed silica, alumina, magnesium oxide, aluminum hydroxide, magnesium hydroxide, glass fibers, nano-clays, zinc oxide, aluminum silicate, calcium silicate, titanium dioxide, titanates, glass microspheres and chalk. In certain embodiments, the filler is selected from calcium carbonate and barium sulfate. In certain embodiments, the filler is selected from aluminum hydroxide and magnesium hydroxide.

Ignition resistant fillers which can be used in the compositions include antimony oxide, decabromobiphenyl oxide, alumina trihydrate, magnesium hydroxide, borates, and halogenated compounds. Other miscellaneous fillers suitable for use in the compositions include wood fibers/flours/chips, ground rice hulls, cotton, starch, glass fibers, synthetic fibers (e.g., polyolefin fibers), and carbon fibers. Hydrated alumina can also be used as a filler to obtain blends which are flame retardant.

The amount of the filler depends upon the filler density; the higher the filler density, the more of it which can be added to the formulation without appreciably affecting the volume fraction of that filler. The level of filler in a blend composition may be described by weight or volume. The volume percent of the filler may be estimated by the equation:

$$\text{vol }\%_F = [(\text{wt }\%_F/\rho_F) \times 100\%]/[(\text{wt }\%_F/\rho_F) + \Sigma(\text{wt }\%_i/\rho_i)]$$

Where vol $\%_F$ is equal to the volume percent of the filler in the final composition, wt $\%_F$ is equal to the weight percent of the filler; $\rho_F$ is the density of the filler measured in grams per cubic centimeter (g/cm$^3$); wt $\%_i$ is the weight percent of the i$^{th}$ component; $\rho_i$ is the density of the i$^{th}$ component measured in grams per cubic centimeter (g/cm$^3$).

Accordingly, the level of the filler is discussed herein in terms of weight percent filler, based on the total weight of the composition. Particle size of the filler has some effect on the amount of filler used in the compositions. Fine particle size fillers generally have a tendency to result in higher blend viscosities, and they are also more expensive. The use of fine filler, especially at high filler loading, results in a smoother extrudate surface when molten blend is extruded through a die orifice. The attendant benefits of using fine particle size filler in filled polymer compositions are described in U.S. Pat. No. 4,263,196, the disclosure of which is hereby incorporated by reference in its entirety. In the exemplary compositions provided herein, calcium carbonate used has a particle size between about 3.2 micron and about 8 micron.

In certain embodiments, the use of many types of fillers or combination thereof is possible without altering the properties of the filled polymer compositions. For example, inclusion of alumina trihydrate (ATH, $Al_2O_3.3H_2O$) is highly desirable when flame-retardant or low-smoke-tendency compositions are desired. Heavy fillers, such as powdered iron or lead, or oxides or shavings of them, can be employed when ultra-dense compositions are desired. Similarly, minerals having low density, such as magnesium carbonate, magnesium oxide, magnesium hydroxide, calcium sulfate, silica, fly ash, and cement dust, or organic fillers such as yarns, wood flour, nut shells, rice hulls, cornmeal, clay, and the like, can be employed when light-density compositions are needed. Finally, fillers with varied aspect ratios, such as talc, mica, from highly acircular (wollastonite, for example) to round (glass beads, for example) can also be employed to alter relationships such as tensile strength or elongation.

The filler is present in an amount ranging from about 30% up to about 95% by total weight of the filled polymer compositions provided herein. In certain embodiments, the filler is present in an amount ranging from about 40% up to about 90%, from about 45% up to about 85%, from about 50% up to about 85%, from about 60% up to about 81% by total weight of the composition. In certain embodiments, the ethylene/α-olefin interpolymer is present in about 30%, 35%, 40%, 45%, 50%, 55%, 60%, 65%, 70%, 75%, 80%, 81%, 85%, 90% or 95% by total weight of the composition.

Component C

It may further be useful to employ any one or combination of plasticizing substances in the compositions provided herein. The plasticizer, when present in the compositions provided herein, can be selected from one of several groups. The first group is a group known as processing oils. Three types of processing oils are known-paraffinic, aromatic, and naphthenic. Processing oils are also subdivided by viscosity range. "Thin" oils can be as low as 100-500 SUS (Saybolt Universal Seconds) at 100° F. (38° C.) "Heavy" oils can be as high as 6000 SUS at 100° F. Processing oils, especially naphthenic and paraffinic oils with viscosity of from about 100 to 6000 SUS at 100° F. are used in certain embodiments.

The second group of plasticizers that are effective, when used in the compositions provided herein, is a group that comprises epoxidized oils such as epoxidized soybean oil and epoxidized linseed oil.

The third group of plasticizers that can be used in the compositions herein, are polyesters which, in general are liquid condensation products of a polybasic acid and a polyol. The term "liquid" as used herein means pourable at room temperature. The acid component is most often a saturated aliphatic dibasic acid, or an aromatic dibasic acid, adipic acid, azelaic acid, phthalic acid, sebacic acid, and glutaric acid, or mixtures of these acids are commonly used. The polyol can be an aliphatic polyol or a poly-oxyalkylene polyol, such as ethylene glycol, propylene glycol, 1,4- and 1,3-butane glycol, diethylene glycol, and polyethylene glycol. In some embodiments, polyester compositions comprise an acid component of which greater than 50% by weight are aliphatic polyol, such as aliphatic glycol. Plasticizers based on adipic or azelaic acid, and propylene glycol or the 1,3- or 1,4-butane glycol can also be used herein. The molecular weight of these plasticizers can vary from a low of a few hundred up to a high of about 10,000. The molecular weight of commercial products is seldom specified; however, typically in the trade, the molecular weight range of the product is classified as low, medium, or high. A suitable range for the compositions herein can be medium.

Mixtures of polyester or epoxidized oils with hydrocarbon oils are also effective plasticizers in certain of the compositions. One objective of using such a mixture is to couple the high efficiency of the relatively high cost polyester or epoxidized oil with the low cost of the hydrocarbon oil. The cost/performance of a compound plasticized with such a mixture can be improved significantly for a given application because properties can be tailored more precisely, or filler levels can be increased.

Where a mixture of the polyester plasticizer and a hydrocarbon oil is employed, the relative proportions of the two components can be varied over a wide range depending upon performance objectives. Mixtures comprising 50% or less of the polyester are preferred for economic reasons, and most preferred are those comprising 20% or less of the polyester.

A fourth group of plasticizers, polyethers and polyether esters, are also effective for the compositions provided herein. In general, polyethers are oligomers or polymers of alkylene oxides, polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid, fatty acids such as lauric and stearic acids are common examples of the compounds are the mono- and diesters of polyethylene or polypropylene glycol. The molecular weight of polyethers may range up to those typical of high polymers.

In certain embodiments, the polyethers are those consisting of polyols based on random and/or block copolymers of ethylene oxides and propylene oxides. The copolymer polyols provide better performance in terms of efficiency in compositions comprising very high levels of filler.

Mixture of the polyether or the polyether ester plasticizers with either a polyester plasticizer or a hydrocarbon processing oil can also be used in the compositions provided. The advantage of polyether/polyester combination is the lower cost since the polyethers are cheaper than the polyesters. Combinations of polyether and processing oil are also cheaper because of the lower cost of the oil.

The reactive portions of the two components in a polyether/polyester combination will be adjusted according to the efficiency of the system based on property requirements and cost. Those based on polyester primarily will not be as stiff and will be more expensive, for example, than those based primarily on a polyether or polyether ester.

Where a mixture of the polyether or polyether ester and a hydrocarbon oil is employed, the relative proportions used will again depend on cost and property requirements. Since the polyethers are more expensive than the processing oils, mixtures comprising 50% or less of the polyethers are preferred.

In certain embodiments, the plasticizer is selected from the group consisting of phthalate esters, trimellitate esters, benzoates, aliphatic diesters (including adipates azelates and sebacates), epoxy compounds, phosphate esters, glutarates, polymeric plasticizers (polyesters of glycols and aliphatic dicarboxylic acids) and oils. In certain embodiments, the plasticizer used in the compositions herein is a mixture of paraffinic process oil and stearic acid.

As referred to above, a mixture of processing oil, on the one hand, and epoxidized oil or polyester or polyether or polyether ester, or any combination thereof, on the other hand, can also be used very effectively as the plasticizer for the compositions provided herein. In fact, such a two- or more component plasticizer system, comprising from about 50 to about 95 percent by total weight of processing oil, gives higher tensile elongation than can be obtained using either plasticizer alone at the same level. Maximum elongation can be achieved using a mixture of processing oil and polyester or polyether or polyether ester or any combination thereof containing from about 50 to about 80 percent by total weight of processing oil.

The amount of plasticizer in the composition varies from about 0% up to about 15% or about 10% by total weight of the composition. In certain embodiments, the plasticizer is present in from about 1% up to about 9%, 2% up to about 8%, 3% up to about 8%, 4% up to about 6% by total weight of the composition. In certain embodiments, the plasticizer is present in about 2%, 3%, 4%, 4%, 5%, 6%, 6.5%, 7%, 8%, 9% or 10% by total weight of the composition. In certain embodiments, the plasticizer present is less than 1% by total weight of the composition.

Component D: Additives

Optionally, the filled polymer compositions provided herein can comprise at least one additive for the purposes of improving and/or controlling the processibility, appearance, physical, chemical, and/or mechanical properties of the composition. However, an additive does not function as a filler as described above. In some embodiments, the filled polymer compositions may include one or more of the additives described herein. In other embodiments, the filled polymer compositions may be substantially or completely free of one or more of the additives described herein.

Any polymer additive known to a person of ordinary skill in the art may be used in the filled polymer compositions provided herein. Various additives for use in the filled polymer compositions are listed in U.S. Pat. Nos. 6,787,593; 5,973,049; 6,319,969; 3,904,456; 4,191,798; 4,24,2395; 4,263,196; 4,438,228; 6,254,956 and 6,262,161, all of which are incorporated herein by reference. Non-limiting examples of suitable additives include anti-blocking agents, antioxidants, UV stabilizers, colorants or pigments, cross-linking agents, flame retardants, antistatic agents, and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the filled polymer composition. Some polymer additives have been described in Zweifel Hans et al., "*Plastics Additives Handbook*," Hanser Gardner Publications, Cincinnati, Ohio, 5th edition (2001), which is incorporated herein by reference in its entirety.

In formulating the filled polymer composition, it is preferable that each of the additives are compatible with the ethylene/α-olefin interpolymer used herein so that the additives do not phase separate from the ethylene/α-olefin interpolymer, particularly in molten state. In general, the compatibility of an additive with the ethylene/α-olefin interpolymer increases with a decrease in the difference between their solubility parameters such as Hildebrand solubility parameters. Some Hildebrand solubility parameters are tabulated for solvents in: Barton, A. F. M., *Handbook of Solubility and Other Cohesion Parameters,* 2nd Ed. CRC Press, Boca Raton, Fla. (1991); for monomers and representative polymers in *Polymer Handbook,* 3rd Ed., J. Brandrup & E. H. Immergut, Eds. John Wiley, NY, pages 519-557 (1989); and for many commercially available polymers in Barton, A. F. M., *Handbook of Polymer-Liquid Interaction Parameters and Solubility Parameters*, CRC Press, Boca Raton, Fla. (1990), all of which are incorporated herein by reference. The Hildebrand solubility parameter for a copolymer may be calculated using a volume fraction weighting of the individual Hildebrand solubility parameters for each monomer containing the copolymer, as described for binary copolymers in Barton A. F. M., *Handbook of Solubility Parameters and Other Cohesion Parameters*, CRC Press, Boca Raton, page 12 (1990). The magnitude of the Hildebrand solubility parameter for polymeric materials is also known to be weakly dependent upon the molecular weight of the polymer, as noted in Barton, pages 446-448. Therefore, there will be a preferred molecular weight range for a given ethylene/α-olefin interpolymer, and adhesive strength may be additionally controlled by manipulating the molecular weight of the ethylene/α-olefin interpolymer or the additives. In some embodiments, the absolute difference in Hildebrand solubility parameter between the ethylene/α-olefin interpolymer and an additive such as the antioxidant falls within the range of greater than 0 to about 10 $MPa^{1/2}$, about 0.1 to about 5 $MPa^{1/2}$, about 0.5 to about 4.0 $MPa^{1/2}$, or about 1 to about 3.0 $MPa^{1/2}$.

The antioxidant or a stabilizer for use in the filled polymer composition herein includes any antioxidant known to a person of ordinary skill in the art. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); octadecyl-3,5-di-t-butyl-4-hydroxycinnamate (e.g., IRGANOX™ 1076, commercially available from Ciba Geigy) and combinations thereof. Where used, the amount of the antioxidant in the filled polymer composition can be from about greater than 0 to about 10 wt %, from about 0.1 to about 5 wt %, or from about 0.5 to about 2 wt % of the total weight of the filled polymer composition.

In certain embodiments, the filled polymer compositions disclosed herein comprise an UV stabilizer that may prevent or reduce the degradation of the filled polymer compositions by UV radiations. Any UV stabilizer known to a person of ordinary skill in the art may be used herein. Non-limiting examples of suitable UV stabilizers include benzophenones, benzotriazoles, aryl esters, oxanilides, acrylic esters, formamidine carbon black, hindered amines, nickel quenchers, hindered amines, phenolic antioxidants, metallic salts, zinc compounds and combinations thereof. Where used, the amount of the UV stabilizer in the composition can be from about greater than 0 to about 10 wt %, from about 0.1 to about 5 wt %, or from about 0.5 to about 2 wt % of the total weight of the filled polymer composition.

Optionally, the filled polymer compositions provided herein comprise an anti-blocking agent. The anti-blocking agent can be used to prevent the undesirable adhesion between touching layers of articles comprising the polymer composition particularly under moderate pressure and heat during storage, manufacture or use. Any anti-blocking agent known to a person of ordinary skill in the art may be added to the filled polymer compositions provided herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the filled polymer compositions can be from about greater than 0 to about 3 wt %, from about 0.0001 to about 2 wt %, from about 0.001 to about 1 wt %, or from about 0.001 to about 0.5 wt % of the total weight of the filled polymer composition. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

In further embodiments, the filled polymer compositions provided herein optionally comprise a colorant or pigment that can change the look of the filled polymer composition to human eyes. Any colorant or pigment known to a person of ordinary skill in the art may be added to the polymer compositions provided herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Further examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in the composition can be from about greater than 0 to about 10 wt %, from about 0.1 to about 5 wt %, or from about 0.5 to about 2 wt % of the total weight of the composition. In certain embodiments, the pigment is a black concentrate from consolidated plastics. Where used, the amount of the colorant or pigment in the filled polymer composition can be from about greater than 0 to about 10 wt %, from about 0.1 to about 5 wt %, or from about 0.25 to about 2 wt % of the total weight of the filled polymer composition. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the filled polymer compositions proposed herein can comprise a lubricant. In general, the lubricant can be used, inter alia, to modify the rheology of the molten filled polymer compositions, to improve the surface finish of molded articles, and/or to facilitate the dispersion of fillers or pigments. Any lubricant known to a person of ordinary skill in the art may be added to the filled polymer compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, moltan waxes, polyethylene waxes, polypropylene waxes, natural and synthetic paraffin waxes, fluoropolymers and combinations thereof. Where used, the amount of the lubricant in the filled polymer composition can be from about greater than 0 to about 5 wt %, from about 0.1 to about 4 wt %, or from about 0.1 to about 3 wt % of the total weight of the filled polymer composition. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the filled polymer compositions provided herein can comprise an antistatic agent. Generally, the antistatic agent can increase the conductivity of the filled polymer compositions and can prevent static charge accumulation. Any antistatic agent known to a person of ordinary skill in the art may be added to the filled polymer compositions provided herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, 5 ethoxylated alcohols, alkylsulfonates, alkylphosphates, quaternary ammonium salts, alkylbetaines and combinations thereof. Where used, the amount of the antistatic agent in the filled polymer composition can be from about greater than 0 to about 5 wt %, from about 0.01 to about 3 wt %, or from about 0.1 to about 2 wt % of the total weight of the filled polymer composition. Some suitable antistatic agents have been disclosed in Zweifel Hans et al., "*Plastics Additives Handbook,*" *Hanser Gardner Publications, Cincinnati, Ohio,* 5th edition, Chapter 10, pages 627-646 (2001), both of which are incorporated herein by reference.

In further embodiments, the filled polymer compositions provided herein optionally comprise a cross-linking agent that can be used to increase the cross-linking density of the filled polymer compositions. Any cross-linking agent known to a person of ordinary skill in the art may be added to the filled polymer compositions herein. Non-limiting examples of suitable cross-linking agents include organic peroxides (e.g., alkyl peroxides, aryl peroxides, peroxyesters, peroxycarbonates, diacylperoxides, peroxy-ketals, and cyclic peroxides) and silanes (e.g., vinyltrimethoxysilane, vinyl-triethoxysilane, vinyltris(2-methoxyethoxy)silane, vinyltriacetoxysilane, vinyl-methyldimethoxysilane, and 3-methacryloyloxypropyltrimethoxysilane). Where used, the amount of the cross-linking agent in the filled polymer composition can be from about greater than 0 to about 20 wt %, from about 0.1 to about 15 wt %, or from about 1 to about 10 wt % of the total weight of the filled polymer composition. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the filled polymer compositions can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in certain embodiments.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range from about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other ways for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate containing the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the α-bond to give acyl and dialkoxyalkyl radicals. This type of α-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Visual Approach*, VCH Publishers, Inc., New York, N.Y. 1992; N. J. Turro, et al., *Acc. Chem. Res.,* 1972, 5, 92; and J. T. Banks, et al., *J. Am. Chem. Soc.,* 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—C(OCH$_3$)$_2$—$C_6H_5$, which is commercially available from Ciba-Geigy as Irgacure 651. Examples of other aromatic ketones useful in the practice of this invention as photoinitiators are Irgacure 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more polyolefin backbones together through the formation of covalent bonds with the backbones can be used in this invention. Preferably these photocrosslinkers are polyfunctional, i.e., they contain two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker in the practice of this invention. These compounds are characterized by the ability to generate two or more reactive species (e.g., free radicals, carbenes, nitrenes, etc.) upon exposure to UV-light and to subsequently covalently bond with two polymer chains. Any compound that can preform these two functions can be used in the practice of this invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g., exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional At least one photoadditive, i.e., photoinitiator and optional photocrosslinker, can be introduced to the copolymer by any method known in the art. However, preferably the photoadditive(s) is (are) introduced via a masterbatch concentrate containing the same or different base resin as the copolymer. Preferably, the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1 wt % (based on the total weight of the copolymer).

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range from about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm$^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 J/cm$^2$ to about 50 J/cm$^2$.

Preparation of the Filled Polymer Compositions

The filled polymer compositions provided herein comprise an ethylene/α-olefin interpolymer, a filler and optionally plasticizer and other additives. The blending of the ethylene/α-olefin interpolymer with the filler and additives can be done by any known method that can result in a substantially homogeneous distribution of the components in the compositions. Non-limiting examples of suitable blending methods include melt blending, solvent blending, and the like.

Physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding.

A commercial sized batch-type Banbury or equivalent intensive mixer is entirely suitable for preparing the compositions provided herein. A Farrel continuous mixer ("FCM") is also a good mixing device. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizers should be preblended before addition to the other ingredients of the present invention. This will facilitate uniform distribution of each plasticizer component in the final compression and thus ensure that optimum properties are obtained. If desired, the copolymer and the plasticizer(s) can be precompounded as a "Master batch" in a suitable intensive mixing device (e.g., Banbury mixer or screw extruder). This "Masterbatch" can then be compounded with the filler and the other remaining ingredients to produce the final composition. A mix cycle of, for example, about 3 minutes is generally adequate for the Banbury mixer at an operating temperature usually between, for example, 325° and 375° F. The operating rate for the FCM unit generally will fall within ranges predicted by literature prepared by the Farrel Company, Ansonia, Conn. Again, temperatures between 325° and 375° F. are effective. In both cases, a very low plasticizer level, say about 2-3%, may require higher temperatures, while plasticizer levels above about 7% may mix well at lower mixer temperatures. Other devices for compounding of viscous mixes (MI of 0.1 to 20) should be entirely satisfactory.

Once blends are mixed, routine commercial practices may be used, such as underwater melt cutting plus drying or use of sheeting plus chopping methods, to produce a final pelletized product.

Applications of the Filled Polymer Compositions

In general, there are three ways in which sound can be minimized or "managed." The sound waves can be blocked, the vibrations can be damped, or the noise can be absorbed. To manage sound in these various ways, articles with different characteristics are required.

The compositions provided herein are amenable to a wide range of fabricating techniques for the production of economic sound management articles. They may be manipulated, by adjusting the amounts and types of components, such that they are easily molded. The compositions disclosed herein can be fabricated into films, including blown films, sheets, moldings, foam sheet, foam plank, expandable and foamable particles, moldable foam beads, and injection molded articles by conventional processes. The compositions can also be used in the manufacture of fibers, foams and lattices, as well as adhesive and sealant formulations.

The compositions provided herein can be formed into articles by any suitable means known in the art and may be employed in any application in which the desired properties are useful. Included in the available means for forming the compositions disclosed herein are virtually any types of molding, extruding, calendering or casting. In certain embodiments, the filled polymer compositions provided herein can be used in sheeting field, particularly for low-cost, noise, vibration and harshness improving applications.

In certain embodiments, the filled polymer compositions provided herein can readily be extruded onto a substrate, such as an automotive carpet, or can be extruded or calendared as unsupported film or sheet. Depending on the equipment used, and the compounding techniques employed, it is possible to extrude wide ranges of film thickness, from below 20 mils to above 100 mils. This, then provides industry with an opportunity to vary the amount of sound deadening to be attained by varying film thickness, density of blends, ratio of filler load to binder, and similar techniques well known in the art.

The sound-deadening sheet produced may be used in various ways including, but not limited to, extruded sheet to be used as a moldable sound barrier in sound deadening applications including transport systems such as automobiles, motor cycles, buses, tractors, trains, trams, aeroplanes, and the like, automotive door and truck liners, rear seat strainers, wheel well covers, carpet under layments, molded dash insulators, dash mats, construction, wallpapers/coverings, and paper/textiles industries, small and large appliances, including dishwashers, refrigerators, air conditioners, and the like, household items like blender housings, power tools, lawn and garden items like leaf blowers, snow blowers, small engines like outboard motors, jet ski's, and the like. Additional applications are apparent one of skill in the art and include devices for modifying the sound of a drum, loudspeaker systems, composite sound walls, acoustically damped disc drive systems, mufflers, thermoformable acoustical mat compositions, sound damping units for vacuum cleaning machines, systems for reducing drag and noise of underwater vehicles, automotive headliners having improved sound management characteristics, sound damped automotive enclosures such as oil pans, high heat, sound damping metal-polymer laminates, molded carpet assemblies with sound deadening backing, vibration-damping constrained-layer constructions, conveyor belts and material transfer systems, sound insulation moldable carpets, non-squeal disc brake pads, and the like. Further applications include coatings for wires and cables in a variety of electronic, telecommunications and similar areas in which cable or wire coatings are desirable. In sheet form, the filled polymer compositions can be used as drapes or hanging to shield or to surround a noisy piece of factory equipment such as a loom, a forging press, etc. In laminated sheet form (including coextruded structures), the filled compositions provided herein, faced with another material, can be used to achieve both a decorative and a functional use, such as dividing panels in an open-format office.

In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*,"

Ellsevier Applied Science Publishers, New York, N.Y. (1985), both of which are incorporated herein by reference in their entirety.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$M_{polyethylene} = 0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the $1^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (PIN N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity PLUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4 Comparative Examples A*-C*

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19. Comparative Examples D*-F*

Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-fill at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention

[1]standard cm³/min

[2][N-(2,6-di(1-methylethyl)phenyl)amido)(2-isopropylphenyl)(α-naphthalen-2-diyl(6-pyridin-2-diyl)methane)]hafnium dimethyl

[3]bis-(1-(2-methylcyclohexyl)ethyl)(2-oxoyl-3,5-di(t-butyl)phenyl)immino) zirconium dibenzyl

[4]molar ratio in reactor

[5]polymer production rate

[6]percent ethylene conversion in reactor

[7]efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | Tm − $T_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, $G'(25° C.)/G'(100° C.)$. Several commercially available polymers are included in the tests: Comparative Example G* is a substantially linear ethylene/1-octene copolymer (AFFINITY®, available from The Dow Chemical Company), Comparative Example H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL 1840, available from The Dow Chemical Company), Comparative Example J* is a hydrogenated styrene/butadiene/styrene triblock copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | $G'(25° C.)/G'(100° C.)$ | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, $G'(25° C.)/G'(100° C.)$, for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative Examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19 A-F

Continuous Solution Polymerization, Catalyst A1/B2+DEZ

Continuous solution polymerizations are carried out in a computer controlled well-mixed reactor. Purified mixed alkanes solvent (Isopar™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 7A. Selected polymer properties are provided in Table 7B and Table 7C.

TABLE 7a

Polymerization Conditions for Polymers 19A–J

| Ex. | $C_2H_4$ lb/hr | $C_8H_{16}$ lb/hr | Solv. lb/hr | $H_2$ sccm[1] | T ° C. | Cat A1[2] Conc. ppm | Cat A1 Flow lb/hr | Cat B2[3] Conc. ppm | Cat B2 Flow lb/hr | DEZ Conc wt % | DEZ Flow lb/hr | Cocat 1 Conc. ppm |
|---|---|---|---|---|---|---|---|---|---|---|---|---|
| 19A | 55.29 | 32.03 | 323.03 | 101 | 120 | 600 | 0.25 | 200 | 0.42 | 3.0 | 0.70 | 4500 |
| 19B | 53.95 | 28.96 | 325.3 | 577 | 120 | 600 | 0.25 | 200 | 0.55 | 3.0 | 0.24 | 4500 |

TABLE 7a-continued

Polymerization Conditions for Polymers 19A–J

| | | | | | | | | | | | | |
|---|---|---|---|---|---|---|---|---|---|---|---|---|
| 19C | 55.53 | 30.97 | 324.37 | 550 | 120 | 600 | 0.216 | 200 | 0.609 | 3.0 | 0.69 | 4500 |
| 19D | 54.83 | 30.58 | 326.33 | 60 | 120 | 600 | 0.22 | 200 | 0.63 | 3.0 | 1.39 | 4500 |
| 19E | 54.95 | 31.73 | 326.75 | 251 | 120 | 600 | 0.21 | 200 | 0.61 | 3.0 | 1.04 | 4500 |
| 19F | 50.43 | 34.80 | 330.33 | 124 | 120 | 600 | 0.20 | 200 | 0.60 | 3.0 | 0.74 | 4500 |
| 19G | 50.25 | 33.08 | 325.61 | 188 | 120 | 600 | 0.19 | 200 | 0.59 | 3.0 | 0.54 | 4500 |
| 19H | 50.15 | 34.87 | 318.17 | 58 | 120 | 600 | 0.21 | 200 | 0.66 | 3.0 | 0.70 | 4500 |
| 19I | 55.02 | 34.02 | 323.59 | 53 | 120 | 600 | 0.44 | 200 | 0.74 | 3.0 | 1.72 | 4500 |
| 19J | 7.46 | 9.04 | 50.6 | 47 | 120 | 150 | 0.22 | 76.7 | 0.36 | 0.5 | 0.19 | — |

| Ex. | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff.[7] |
|---|---|---|---|---|---|---|---|---|
| 19A | 0.65 | 525 | 0.33 | 248 | 83.94 | 88.0 | 17.28 | 297 |
| 19B | 0.63 | 525 | 0.11 | 90 | 80.72 | 88.1 | 17.2 | 295 |
| 19C | 0.61 | 525 | 0.33 | 246 | 84.13 | 88.9 | 17.16 | 293 |
| 19D | 0.66 | 525 | 0.66 | 491 | 82.56 | 88.1 | 17.07 | 280 |
| 19E | 0.64 | 525 | 0.49 | 368 | 84.11 | 88.4 | 17.43 | 288 |
| 19F | 0.52 | 525 | 0.35 | 257 | 85.31 | 87.5 | 17.09 | 319 |
| 19G | 0.51 | 525 | 0.16 | 194 | 83.72 | 87.5 | 17.34 | 333 |
| 19H | 0.52 | 525 | 0.70 | 259 | 83.21 | 88.0 | 17.46 | 312 |
| 19I | 0.70 | 525 | 1.65 | 600 | 86.63 | 88.0 | 17.6 | 275 |
| 19J | — | — | — | — | — | — | — | — |

[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 7b

Polymer Physical properties

| Polymer Ex. No. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |

TABLE 7C

Average Block Index For exemplary polymers[1]

| Example | Zn/C2[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the measurement and calculation of the block indices for various polymers is disclosed in U.S. patent application Ser. No. ___(insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2] Zn/C2*1000 = (Zn feed flow*Zn concentration/1000000/Mw of Zn)/Total Ethylene feed flow*(1-fractional ethylene conversion rate)/Mw of Ethylene)*1000. Please note that "Zn" in "Zn/C2*1000" refers to the amount of zinc in diethyl zinc ("DEZ") used in the polymerization process, and "C2" refers to the amount of ethylene used in the polymerization process.

Filled Polymer Composition Examples

Certain filled polymer compositions were prepared using a Banbury mixer. The ethylene/α-olefin interpolymer was added to the heated chamber and mixed for 2 minutes at 50-75 rpm followed by ½ the dry ingredients plus pigment and mixed for 3 minutes. The remainder of the dry ingredients and oil were added and the batch mixed at 30-50 rpm for an additional 8-12 minutes. The batch temperature remained below 135° C. The compound was dropped from the mixer and further processed by calendaring a thin sheet (approx 3mm) on a cool, two roll mill through a single pass. The milled sheets were collected such that the sheet was not stressed during removal from the rolls. The final sheets were allowed to cool between cardboard sheets and subsequently used for physical and mechanical property testing or compression-molded into sheet by heating at 190° C. without pressure for 2 minutes, then at 88.9 kN force for 2 minutes, followed by cooling at 10° C. for 4 minutes at 88.9 kN force.

Alternatively, the filled polymer compositions were prepared using a Haake Rheomix 300 rheometer. The temperature of the sample bowl was set at 190° C. and the rotor speed was 40 rpm. To the sample bowl was added each component separately. The ethylene/α-olefin interpolymer was added first to establish a melt bank, and then the inorganic filler was added at a slow rate so that the powdery filler was incorporated into the polymer melt bank gradually. After all the components were added, the mixing was continued for about five minutes or until a stable torque has been established.

Samples for further testing and evaluation were compression molded a Garver automatic press at 190° C. under 44.45 kN force for 3 minutes. The molten materials were subsequently quenched with the press equilibrated at room temperature using an electronic cooling bath.

Figure 8:
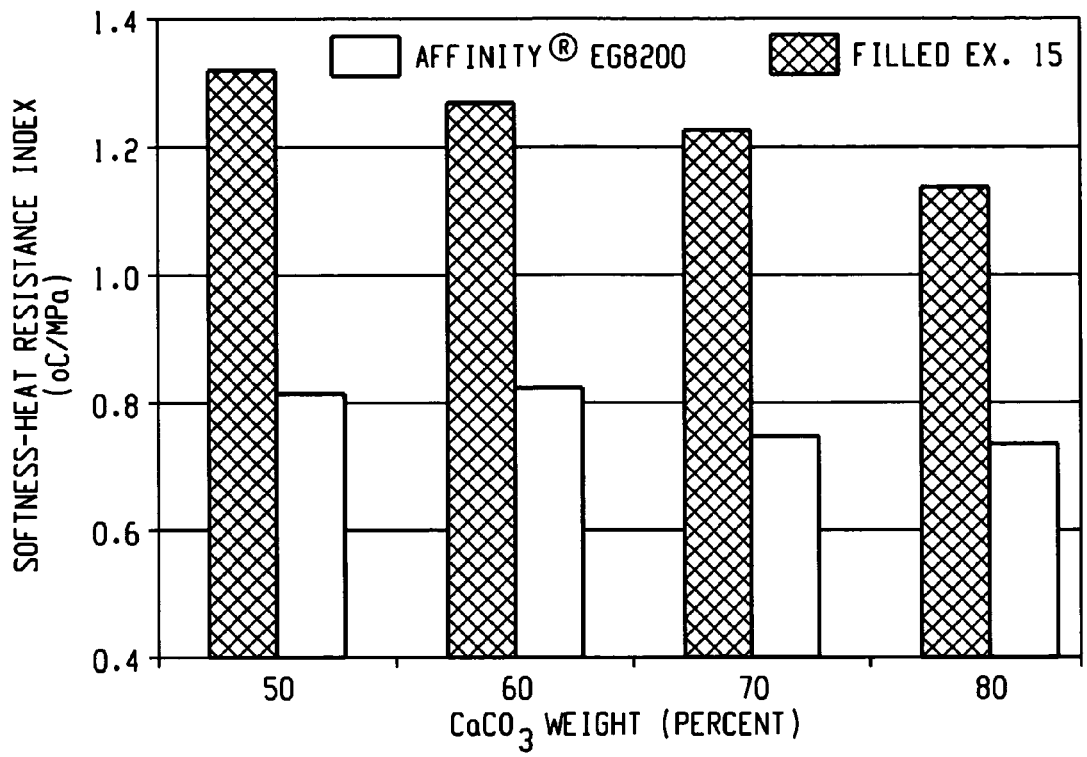
FIG. 8 shows softness-heat resistance index vs. $CaCO_3$ levels in a polymer composition. The filled bars represent filled compositions comprising interpolymer of Example 15; and the unfilled bars represent filled polymer compositions comprising AFFINITY® 8200.
Figure 8A:
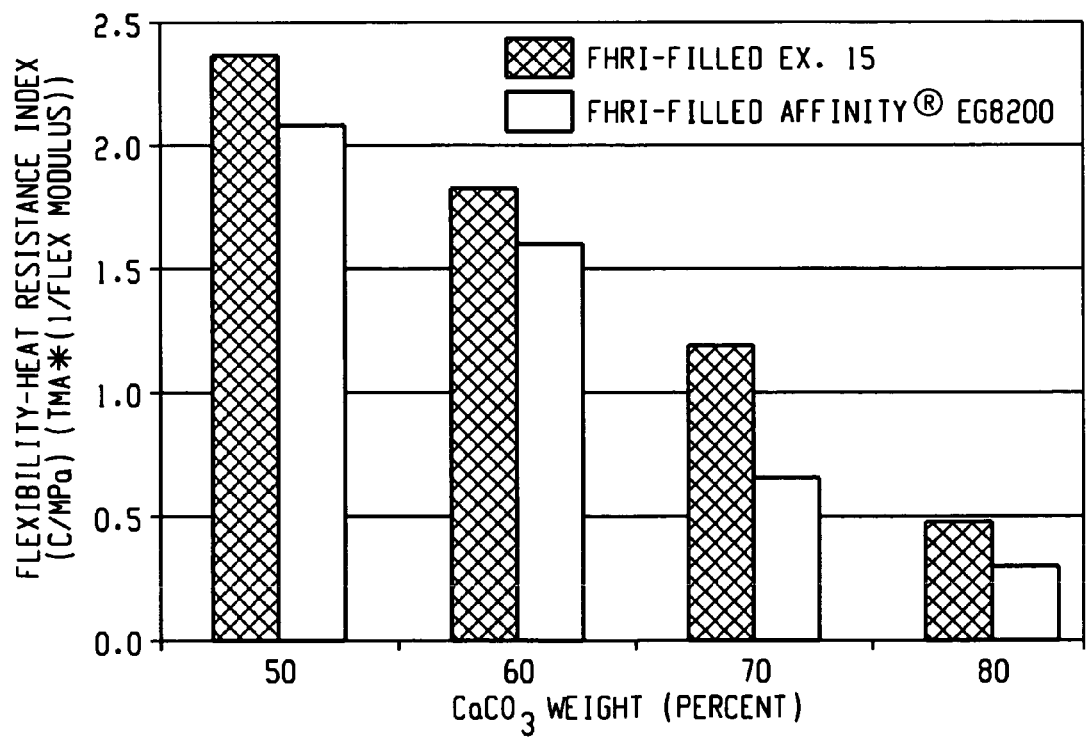
FIG. 8a shows flexibility-heat resistance index vs. $CaCO_3$ levels in filled polymer compositions. The filled bars represent filled compositions comprising interpolymer of Example 15; and the unfilled bars represent filled polymer compositions comprising AFFINITY® 8200.
Figure 8B:
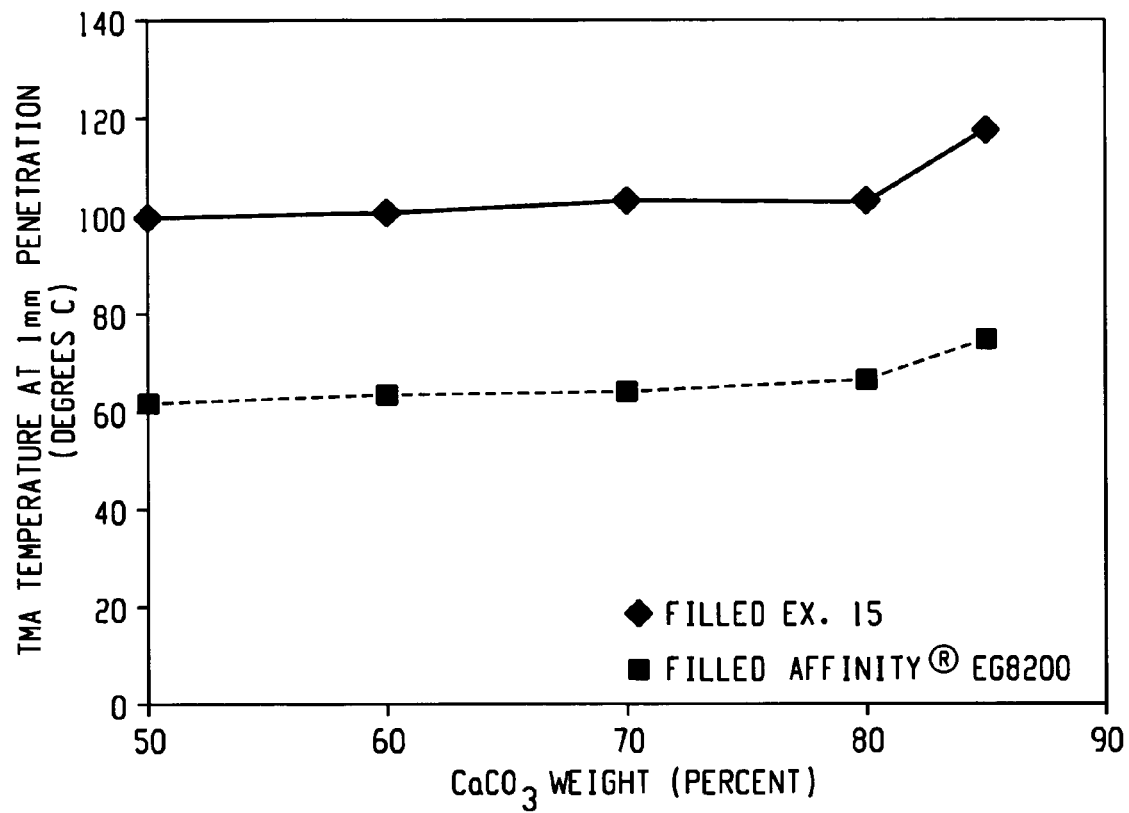
FIG. 8b shows TMA temperature at 1 mm penetration in filled polymer compositions comprising inventive interpolymer and AFFINITY® EG8200 polymer at various $CaCO_3$ levels. (EXAMPLES #20-23 vs. Control #1-4 in Table 8). The diamonds represent filled polymer compositions comprising interpolymer of Example 15; and the squares represent filled polymer compositions comprising AFFINITY® EG8200.

The filler contents, hardness, heat resistance and flexural modulus of calcium carbonate filled polymer compositions provided herein and comparative control examples are compared. These data are shown in Table 8.

range of $CaCO_3$ filler content level are illustrated in FIG. 8b. As seen in the figure, the filled polymer compositions with ethylene/α-olefin interpolymer (EXAMPLES #20-23) provided herein have relatively higher TMA over a range of $CaCO_3$ filler content as compated to TMA for Control #1-4.

The TMA (1 mm) for the new filled polymer compositions provided herein and for filled AFFINITY® EG8200 over a range of $CaCO_3$ filler content level are illustrated in FIG. 8b. As seen in the figure, the filled polymer compositions with

TABLE 8

Calcium carbonate filled polymer compositions

| Components/properties | Exm. 20 | Exm. 21 | Exm. 22 | Exm. 23 | Control 1 | Control 2 | Control 3 | Control 4 |
|---|---|---|---|---|---|---|---|---|
| Interpolymer of Ex. 15 (wt %) | 50 | 40 | 30 | 20 | | | | |
| AFFINITY ® EG8200 (wt %) | | | | | 50 | 40 | 30 | 20 |
| Hubercarb G3T (wt %) | 50 | 60 | 70 | 80 | 50 | 60 | 70 | 80 |
| Hardness Shore A, 5 s | 75.8 | 79.4 | 84 | 90.4 | 76.6 | 77.4 | 86.6 | 91.4 |
| TMA temperature (° C.) | 99.9 | 100.5 | 102.9 | 102.9 | 62.3 | 63.6 | 64.7 | 67.1 |
| Flex Modulus (MPa) | 42.2 | 55.2 | 86.2 | 216.3 | 30.0 | 39.6 | 99.5 | 219.6 |
| FHRI | 2.37 | 1.82 | 1.19 | 0.48 | 2.08 | 1.60 | 0.65 | 0.31 |
| SHRI | 1.32 | 1.27 | 1.22 | 1.14 | 0.81 | 0.82 | 0.75 | 0.73 |

Flexibility-Heat Resistance Index is defined here as: FHRI = (1/flexural modulus) * (TMA temperature)
Softness-Heat Resistance Index is defined as: SHRI = (1/Shore A hardness) * (TMA temperature)
1. Interpolymer of Example 15 has $I_2$ of 6 g/10 min. and density of 0.872 g/cc.
2. AFFINITY ® EG8200 is a substantially linear ethylene/1-octene copolymer having $I_2$ of 5 g/10 min. (ASTM D-1238) and density of 0.870 g/cc (ASTM D-792).
3. Hubercarb G3T is calcium carbonate with median particle size of 3.2 micron from J.B. Huber Corporation.
TMA temperature was measured at 1 mm penetration with a heating rate of 5 C/min under 1N force. Shore A hardness was measured according ASTM D-2240.
Flexural modulus was measured according to ASTM D-790.

The filled polymer compositions provided herein (Examples 20-23 in Table 8) showed relatively higher flexibility-heat resistance index and softness-heat resistance index. High hardness-normalized temperature resistance is desired for applications requiring heat resistance and soft touch or flexibility.

The softness-Heat resistance index comparison for the new filled polymer compositions provided herein (Examples 20-23 in Table 8) and for filled AFFINITY® EG8200 at various filler content level are illustrated in FIG. 8. As seen in the figure, the filled polymer compositions with ethylene/x-olefin interpolymer provided herein have relatively higher softness-Heat resistance index over a range of $CaCO_3$ filler content.

The flexibility-Heat resistance index comparison for the new filled polymer compositions provided herein and for filled AFFINITY® EG8200 over a range of $CaCO_3$ filler content level are illustrated in FIG. 8a. As seen in the figure, the filled polymer compositions with ethylene/x-olefin interpolymer (EXAMPLES #20-23) provided herein have relatively higher flexibility-Heat resistance index over a range of $CaCO_3$ filler content.

The TMA (1 mm) for the new filled polymer compositions provided herein and for filled AFFINITY® EG8200 over a ethylene/α-olefin interpolymer (EXAMPLES #20-23) provided herein have relatively higher TMA over a range of $CaCO_3$ filler content as compated to TMA for Control # 1-4.

Figure 8C:
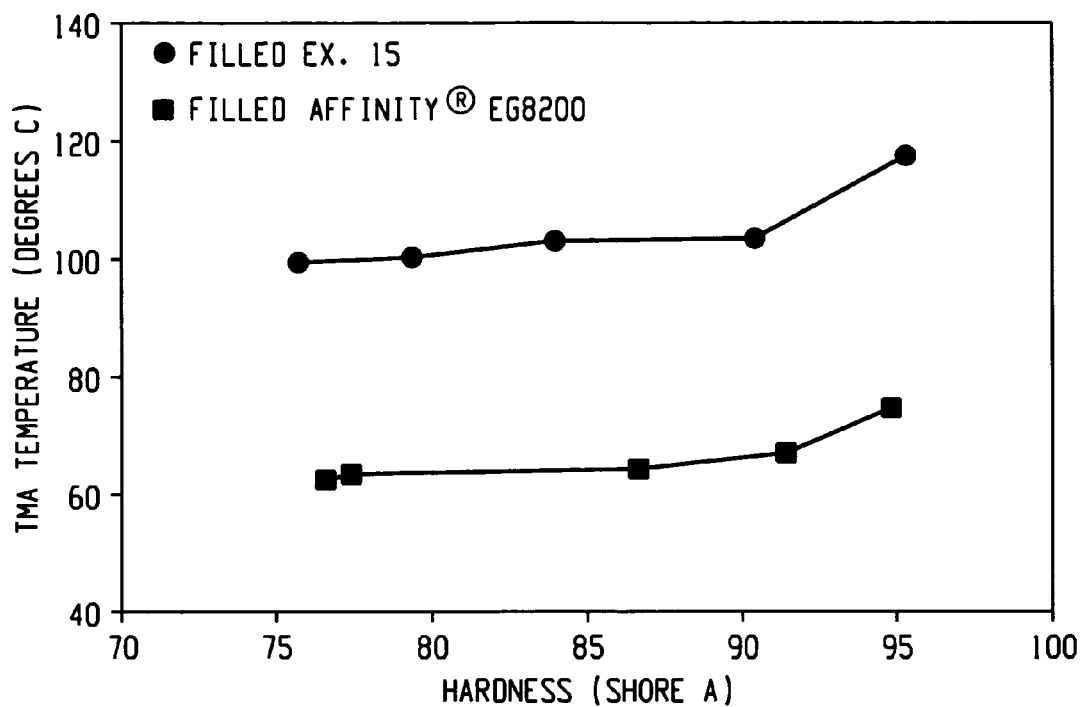
FIG. 8c shows a plot of TMA temperature versus shore A hardness for filled polymer compositions comprising inventive interpolymer and AFFINITY® EG8200 polymer. The circles represent filled polymer compositions comprising interpolymer of Example 15; and the squares represent filled polymer compositions comprising AFFINITY® EG8200.

FIG. 8c illustrates a plot of TMA (1 mm) versus shore A hardness for some inventive polymers, as compared to some known polymers. (EXAMPLES #20-23 vs. Control #1-4 in Table 8).

Figure 8D:
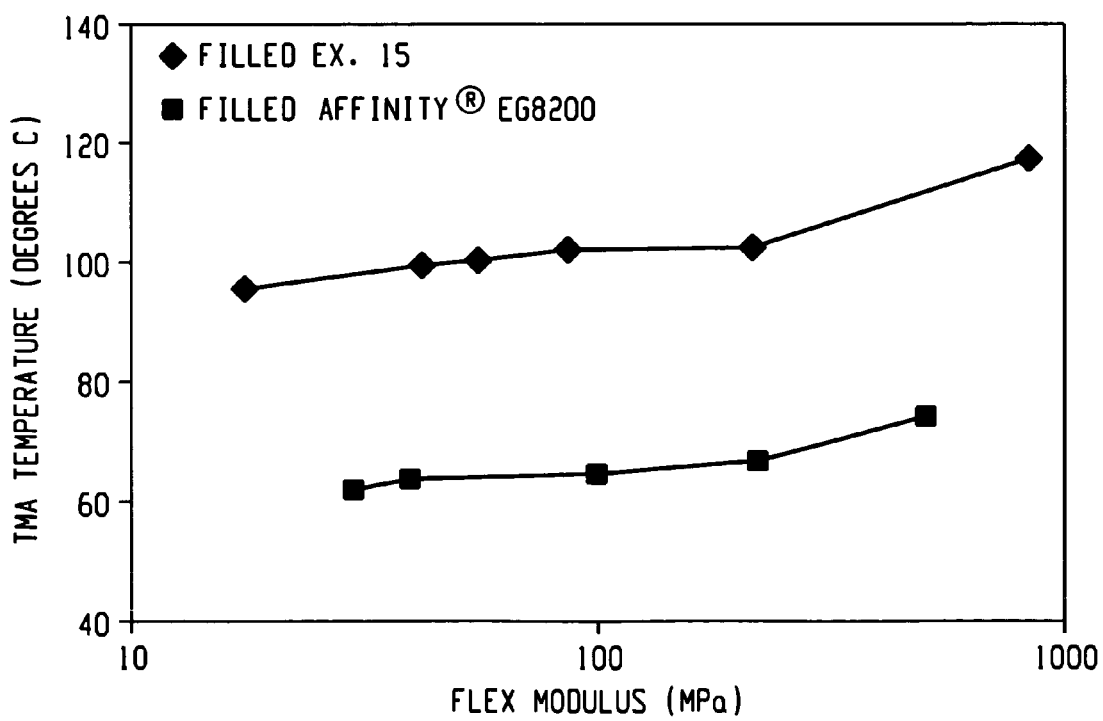
FIG. 8d shows a plot of TMA temperature versus flex modulus for filled polymer compositions comprising inventive interpolymer and AFFINITY® EG8200 polymer. The diamonds represent filled polymer compositions comprising interpolymer of Example 15; and the squares represent filled polymer compositions comprising AFFINITY® EG8200.

FIG. 8d illustrates a plot of TMA (1 mm) versus flex modulus for some inventive polymers, as compared to some known polymers. (EXAMPLES #20-23 vs. Control # 1-4 in Table 8).

Certain of the exemplary filled polymer compositions provided herein show improved heat resistance-flexibility balance as shown in Table 9. In the examples in Table 9, the filled polymer compositions with various additives and about 80 wt % calcium carbonate were evaluated. The compositions, hardness, TMA heat resistance, temperature and flexural modulus of the compression-molded compositions of ethylene/α-olefin interpolymer and corresponding comparative control examples are tabulated in Table 9.

TABLE 9

Compositions and properties of highly formulated, filled polymer compositions of examples and reference control samples

| Components/properties | ASTM | Exm. 24 | Control 5 | Exm. 25 | Control 6 | Control 6a |
|---|---|---|---|---|---|---|
| Interpolymer 19d (wt %) | | 12 | | | | |
| Engage ® 8452 (wt %) | | | 12 | | | |
| Interpolymer 19h (wt %) | | | | 12 | | |
| ENR 7467 (wt %) | | | | | 12 | |

TABLE 9-continued

Compositions and properties of highly formulated, filled polymer compositions of examples and reference control samples

| Components/properties | ASTM | Exm. 24 | Control 5 | Exm. 25 | Control 6 | Control 6a |
|---|---|---|---|---|---|---|
| Elvax ® 460 (wt %) | | | | | | 12 |
| PW8 (wt %) | | 80.25 | 80.25 | 80.25 | 80.25 | 80.25 |
| Paralux 6001 (wt %) | | 6.5 | 6.5 | 6.5 | 6.5 | 6.5 |
| Stearic acid (wt %) | | 0.25 | 0.25 | 0.25 | 0.25 | 0.25 |
| Pigment (wt %) | | 1.0 | 1.0 | 1.0 | 1.0 | 1.0 |
| Density (g/cc) | D-792 | 1.864 | 1.918 | 1.844 | 1.886 | 1.876 |
| Hardness Shore A, 10 s | D-2240 | 61.5 | 72.5 | 63.5 | 66.0 | 81.0 |
| TMA temperature (° C.) | | 113.9 | 76.8 | 110.8 | 61.9 | 82 |
| Flex Modulus (MPa) | D-790 | 25.0 | 39.5 | 13.5 | 57.2 | 145.6 |
| Flexibility-Heat resistance Index (FHRI) | | 4.6 | 1.9 | 8.2 | 1.1 | 0.6 |
| Softness-Heat resistance Index (SHRI) | | 1.9 | 1.1 | 1.7 | 0.9 | 1.0 |

1. Interpolymer 19d is an olefin block copolymer prepared as described above in Example 19d, having $I_2$ of 5 g/10 min. and density of 0.877 g/cc.
2. Engage ® 8452 is a substantially linear ethylene/1-octene copolymer having $I_2$ of 3 g/10 min. (ASTM D-1238) and density of 0.875 g/cc (ASTM D-792).
3. Interpolymer 19h is an olefin block copolymer prepared as described above in Example 19h, having $I_2$ of 1 g/10 min. and density of 0.865 g/cc.
4. ENR 7467 is an experimental grade substantially linear ethylene/1-butene copolymer having $I_2$ of 1 g/10 min. (ASTM D-1238) and density of 0.862/cc (ASTM D-792).
5. Elvax ® 460 is a poly(ethylene-co-vinyl acetate) copolymer with a nominal 18 wt % of vinyl acetate form DuPont.
6. TMA temperature was measured at 900 um penetration with a heating rate of 5 C/min under 1N force.
7. PW8 is a 8 micron average particle size calcium carbonate from Omya (Propulwhite 8)
8. Paralux 6001 is a paraffinic process oil from Chevron
9. Stearic Acid used was from Fisher Scientific
10. Pigment was a black concentrate from Consolidated Plastics As shown in Table 9, the filled polymer composition of Example 24 exhibited higher Flexibility-Heat Resistance Index (FHRI) and softness-Heat Resistance Index (SHRI) than corresponding comparative Control 5. Similarly, the filled polymer composition of Example 25 exhibited better flexibility-heat resistance balance than comparative Control 6 and Control 6a.

It is further noted that the filled poly(ethylene-co-vinyl acetate) copolymer composition showed hardness higher than that of other Examples and comparative Control samples at a similar filler content level.

Measurement of Properties For Exemplary Filled Polymer Compositions

Table 10 tabulates some exemplary filled polymer compositions comprising interpolymers of Example 19d and Example 19h, Engage® 8450, ENR 7467 and Elvax® 460 as polymers (the amount of the polymer and the other components used is provided in Table 10). Table 11 shows their physical properties, such as rheology, density, compression set, shore A hardness, TMA and sheet tensile. Tables 12 and 13 provide protocol for the synthesis of the exemplary filled polymer compositions comprising the inventive interpolymers and traditional polymer. Table 14 provides indexes that ratio Modulus and Hardness to the TMA penetration temperature.

Figure 9:
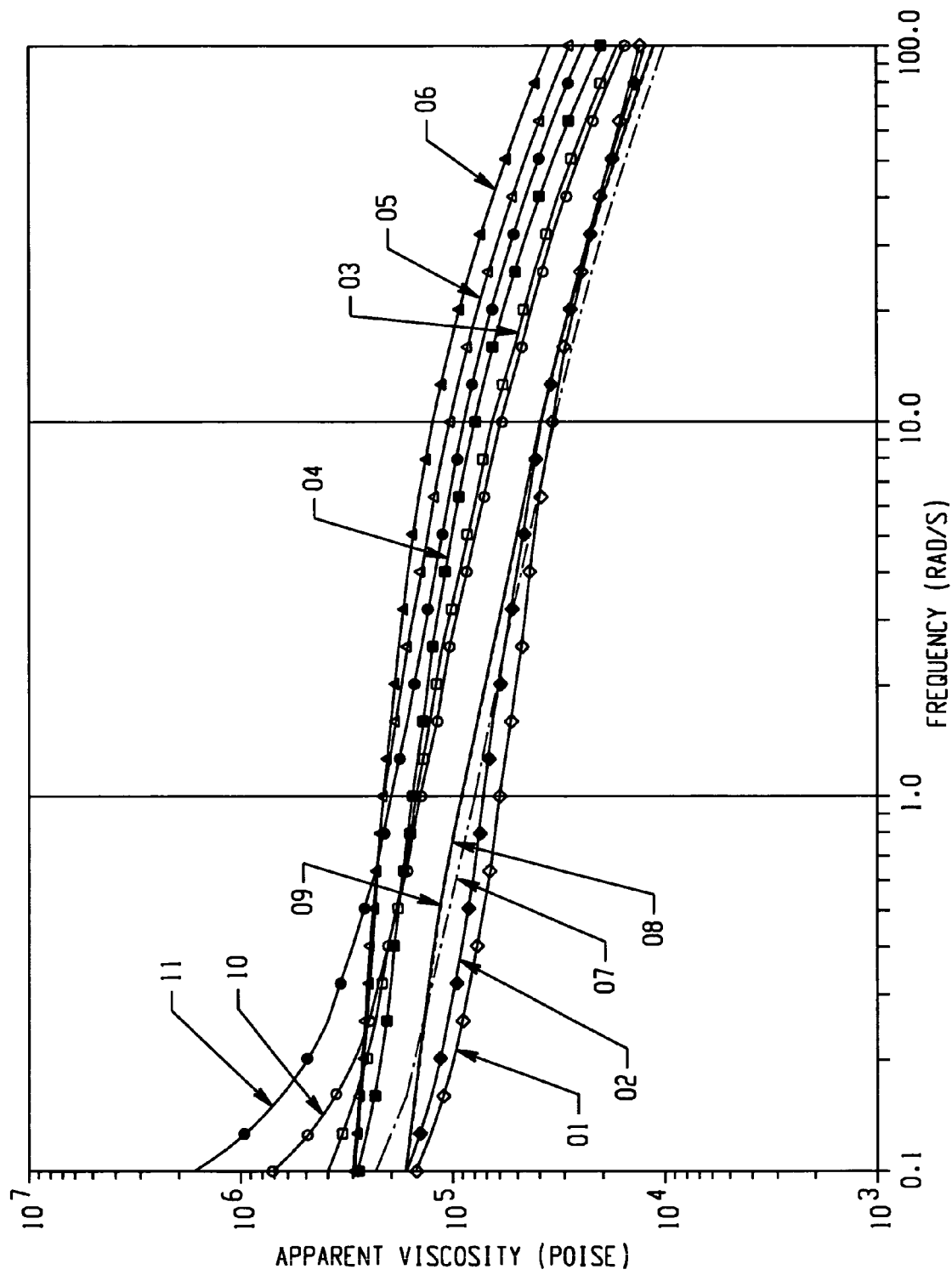
FIG. 9 shows rheology behavior as represented by apparent viscosity for various filled polymer compositions of Examples 24, 25, 26 and 27 and Controls 5, 6, 6a, 7, 8, 9 and 10.
Figure 10:
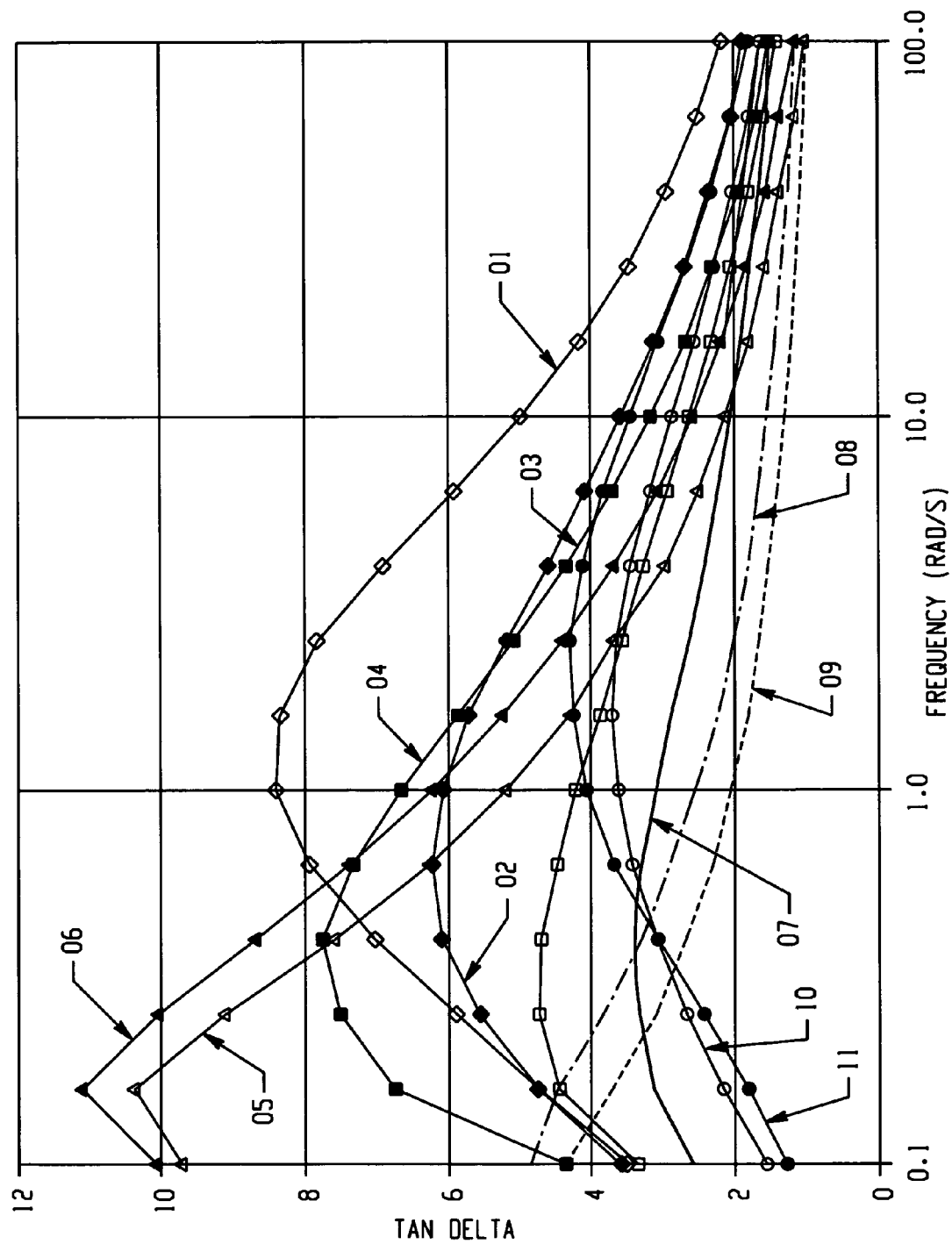
FIG. 10 shows rheology behavior as represented by tan δ for various filled polymer compositions of Examples 24, 25, 26 and 27 and Controls 5, 6, 6a, 7, 8, 9 and 10.

The rheology of some exemplary filled polymer compositions was measured at 150 C and 15% strain. The method used 25 mm diameter parallel plates and a 2.0 mm gap. The samples were conditioned at the temperature for 300 seconds prior to the start of the test. The frequency sweep covered the range of 0.1 to 100 rad/sec The rheology of some exemplary filled polymer compositions are shown in Table 11 and FIGS. 9 and 10.

The densities of some exemplary filled polymer compositions were measured according to ASTM D792, which is incorporated herein by reference. The densities of some exemplary filled polymer compositions are shown in Table 11.

Figure 11:
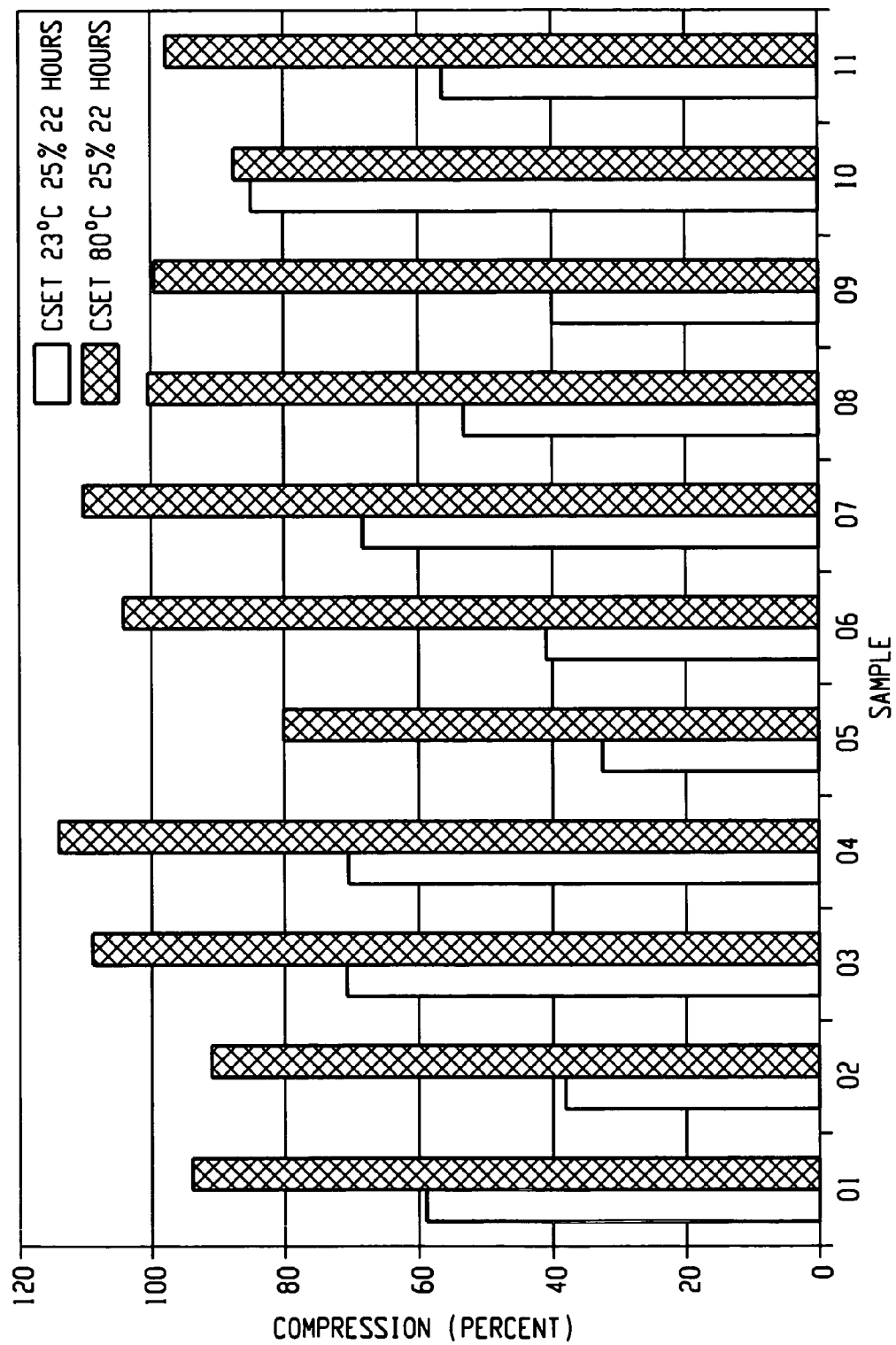
FIG. 11 provides compression set data for some exemplary filled polymer compositions of Examples 24, 25, 26 and 27 and Controls 5, 6, 6a, 7, 8, 9 and 10. The filled bars represent 25% compression set at 23° C. and 22 hours; and the unfilled bars represent 25% compression set at 80° C. and 22 hours.

The compression set of some exemplary filled polymer compositions were measured according to according to ASTM D 395 as described above. The compression set results of some exemplary filled polymer compositions are shown in Table 11 and FIG. 11.

Figure 12:
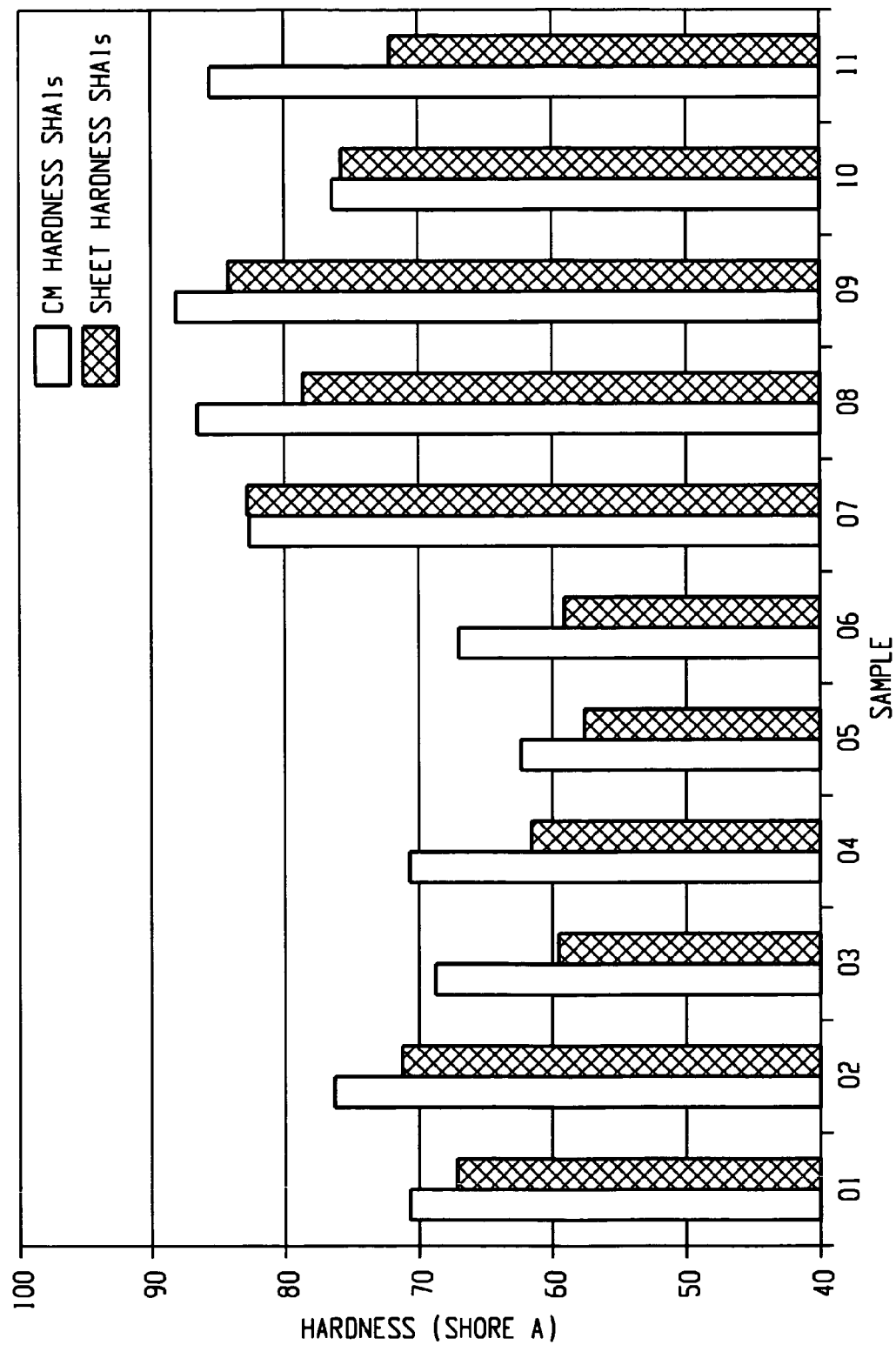
FIG. 12 provides the Shore A hardness for some exemplary filled polymer compositions and comparatives of Examples 24, 25, 26 and 27 and Controls 5, 6, 6a, 7, 8, 9 and 10. The filled bars represent CM hardness; and the unfilled bars represent sheet hardness.

The Shore A hardness of some exemplary filled polymer compositions were measured according to ASTM D 2240, which is incorporated herein by reference. The Shore A hardness results of some exemplary filled polymer compositions are shown in Table 11 and FIG. 12.

Figure 13:
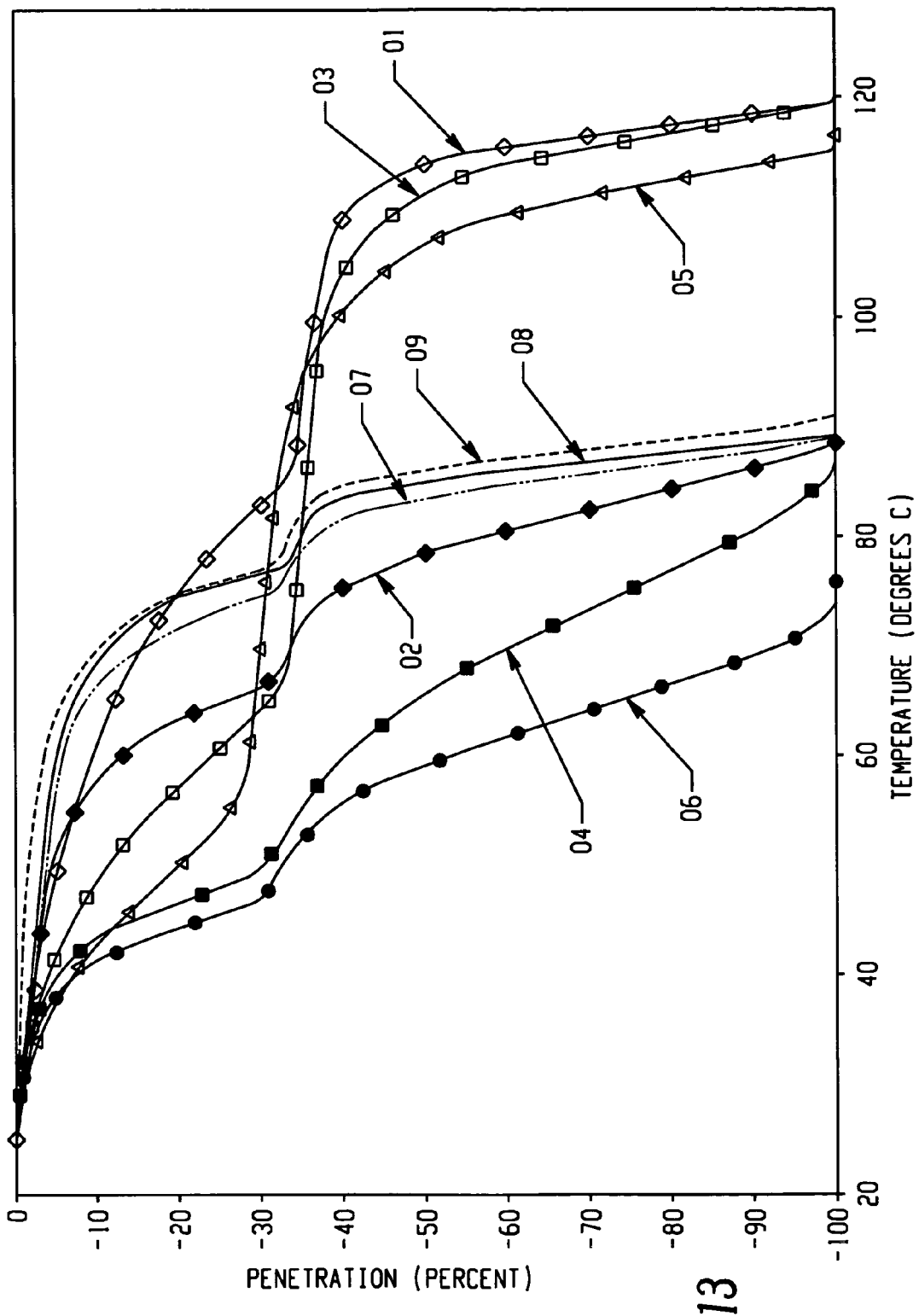
FIG. 13 provides % penetration at various temperatures for some exemplary filled polymer compositions of Examples 24, 25 and 26 and Controls 5, 6, 6a, 7, 8 and 9.
Figure 14:
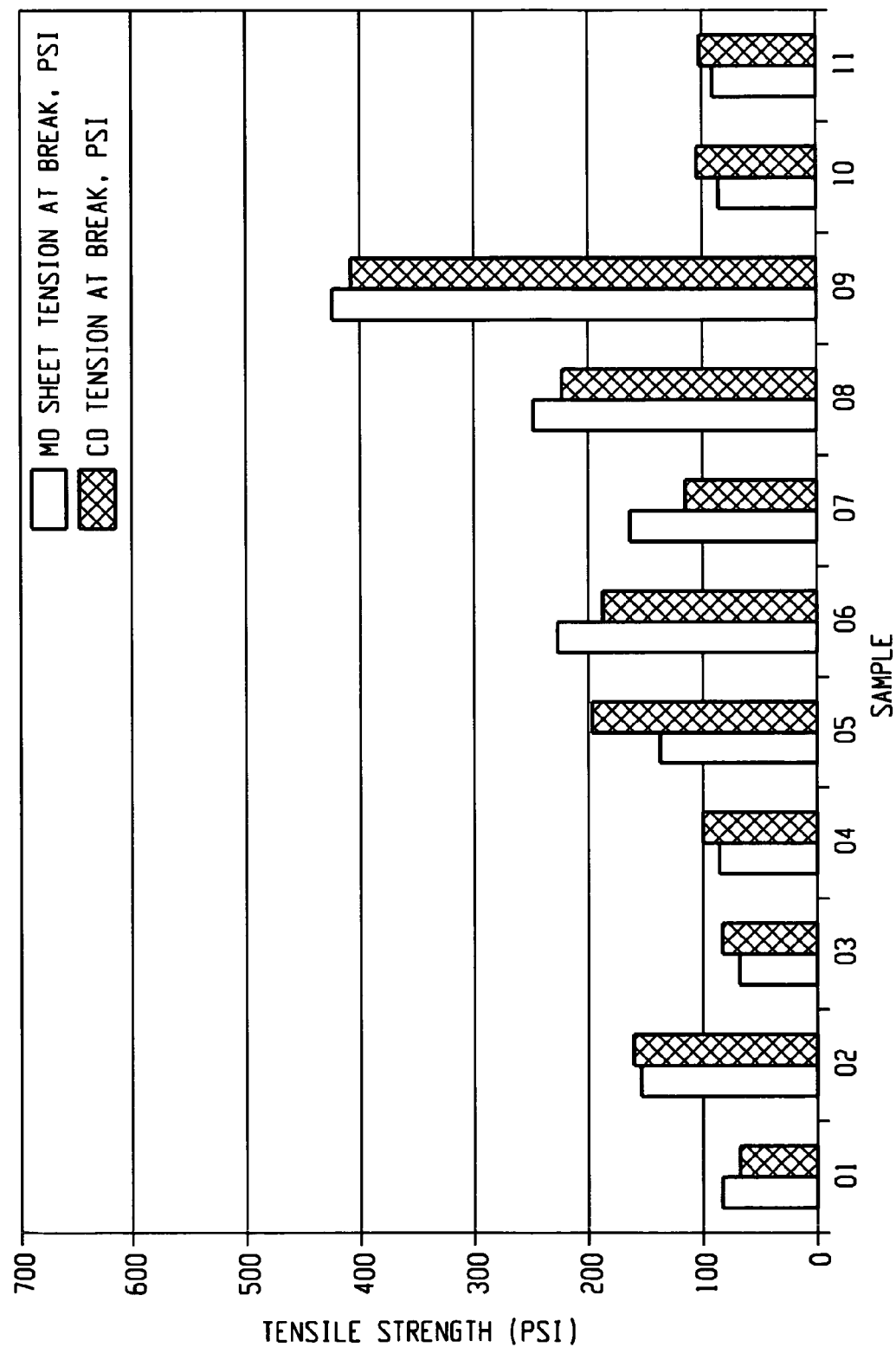
FIG. 14 provides CD sheet tensile at break (represented by the filled bars) and MD sheet tensile at break (represented by the unfilled bars) for some exemplary filled polymer compositions of Examples 24, 25, 26 and 27 and Controls 5, 6, 6a, 7, 8, 9 and 10.
Figure 15:
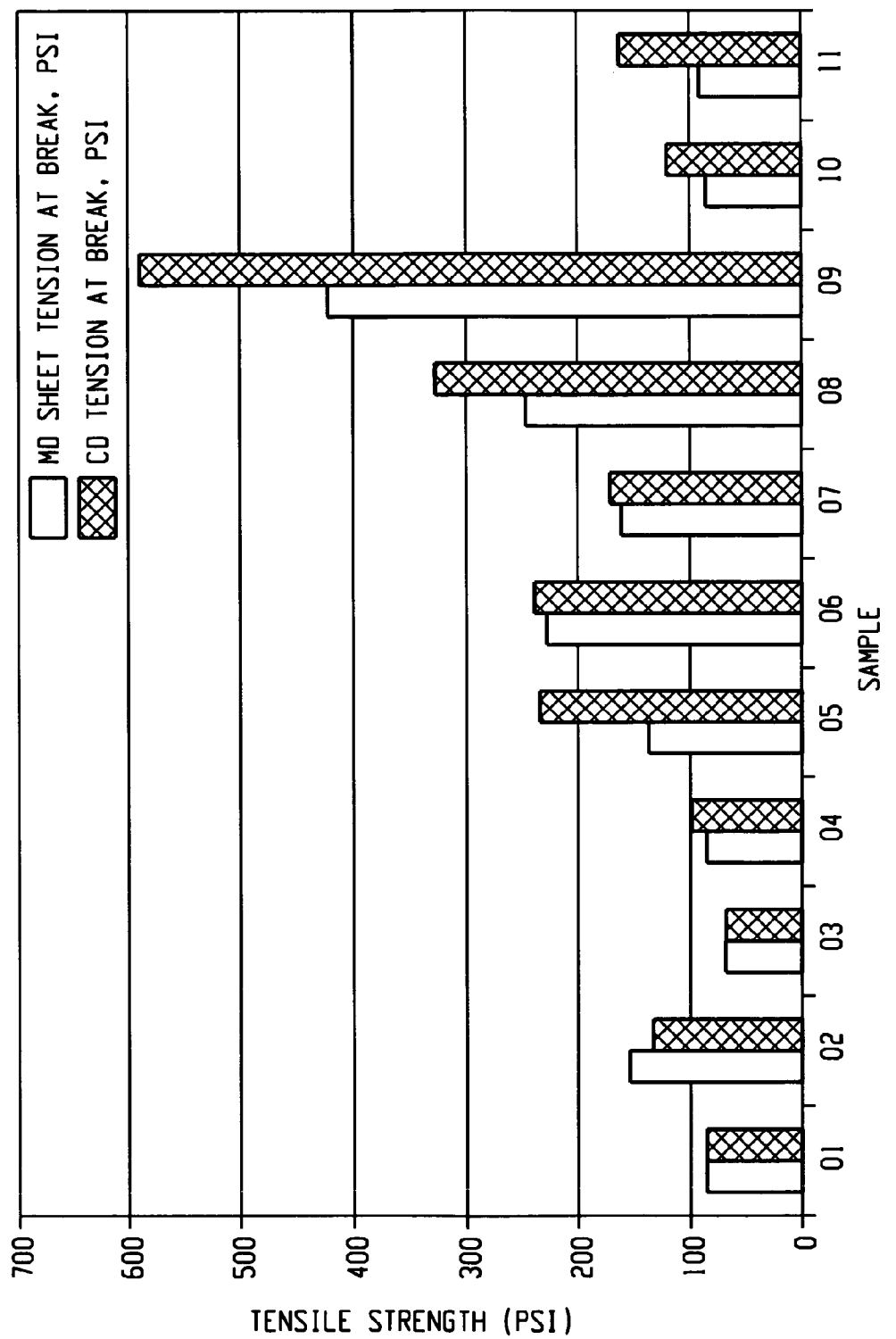
FIG. 15 provides MD sheet tensile at break (represented by the unfilled bars) and CM tensile at break (represented by the filled bars) for some exemplary filled polymer compositions of Examples 24, 25, 26 and 27 and Controls 5, 6, 6a, 7, 8, 9 and 10.
Figure 16:
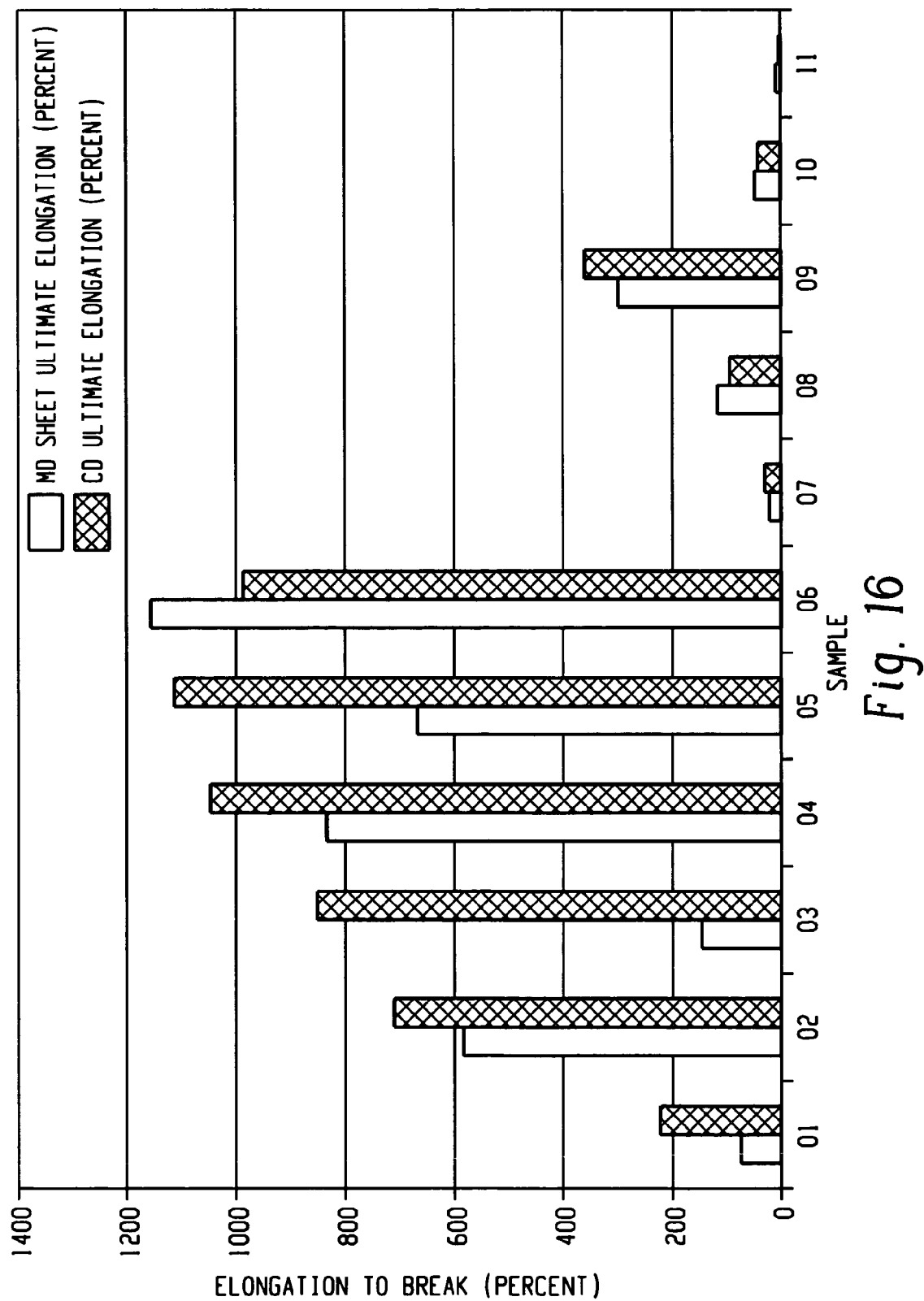
FIG. 16 provides % MD sheet ultimate elongation (represented by the unfilled bars), % CD ultimate elongation (represented by the filled bars) for some exemplary filled polymer compositions of Examples 24, 25, 26 and 27 and Controls 5, 6, 6a, 7, 8, 9 and 10.
Figure 17:
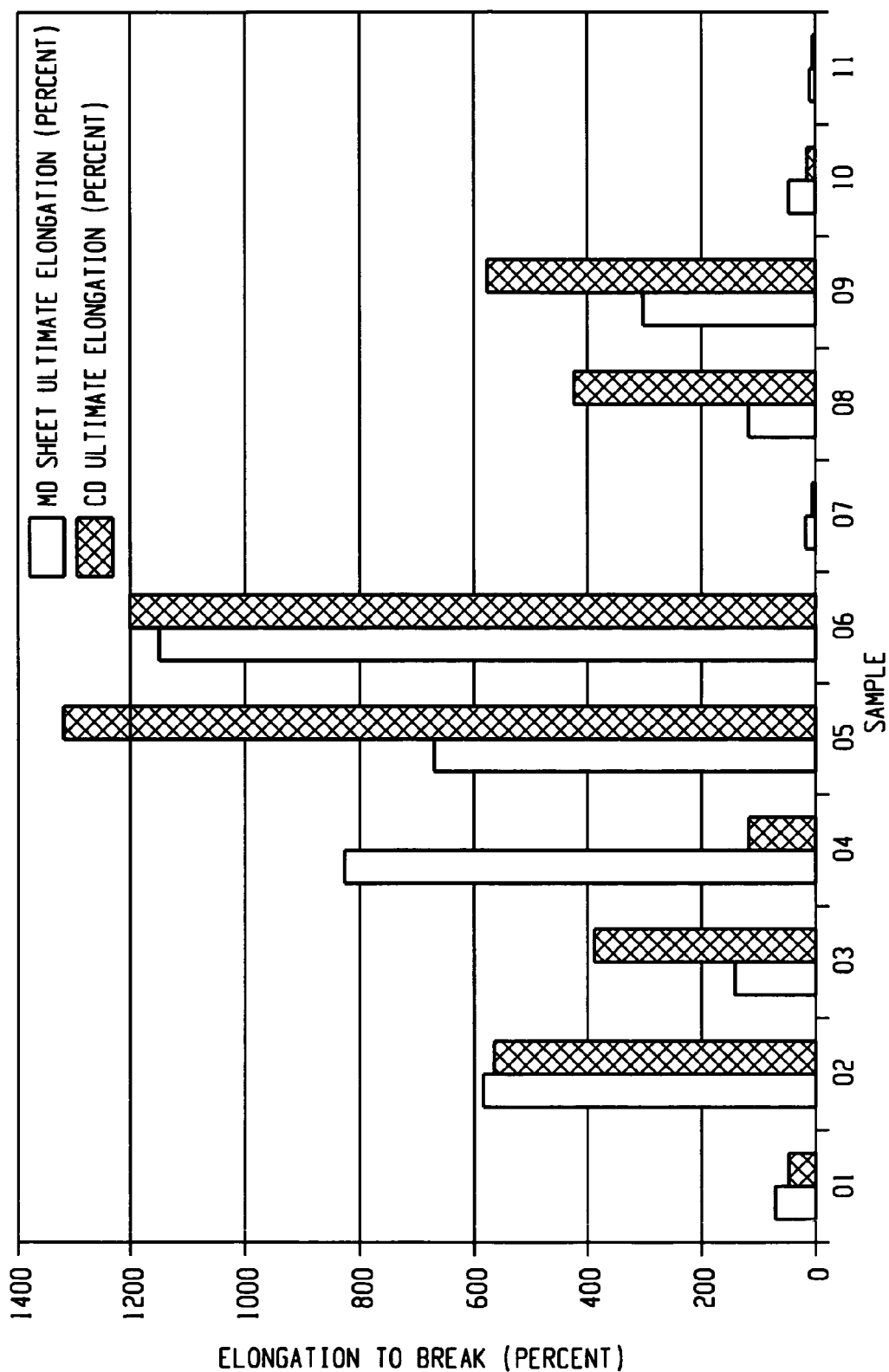
FIG. 17 provides % MD sheet ultimate elongation (represented by the unfilled bars) and % CM ultimate elongation (represented by the filled bars) for some exemplary filled polymer compositions of Examples 24, 25, 26 and 27 and Controls 5, 6, 6a, 7, 8, 9 and 10.

Thermal Mechanical Analysis (Penetration Temperatures) of some exemplary filled polymer compositions are measured as described above. The TMA results of some exemplary filled polymer compositions are shown in Table 11 and FIG. 13.

The tensile strength and elongation of some exemplary filled polymer compositions were measured according to ASTM D 412, which is incorporated herein by reference. The tensile strength and elongation results of some exemplary filled polymer compositions are shown in Table 11 and FIGS. 14-17.

Figure 18:
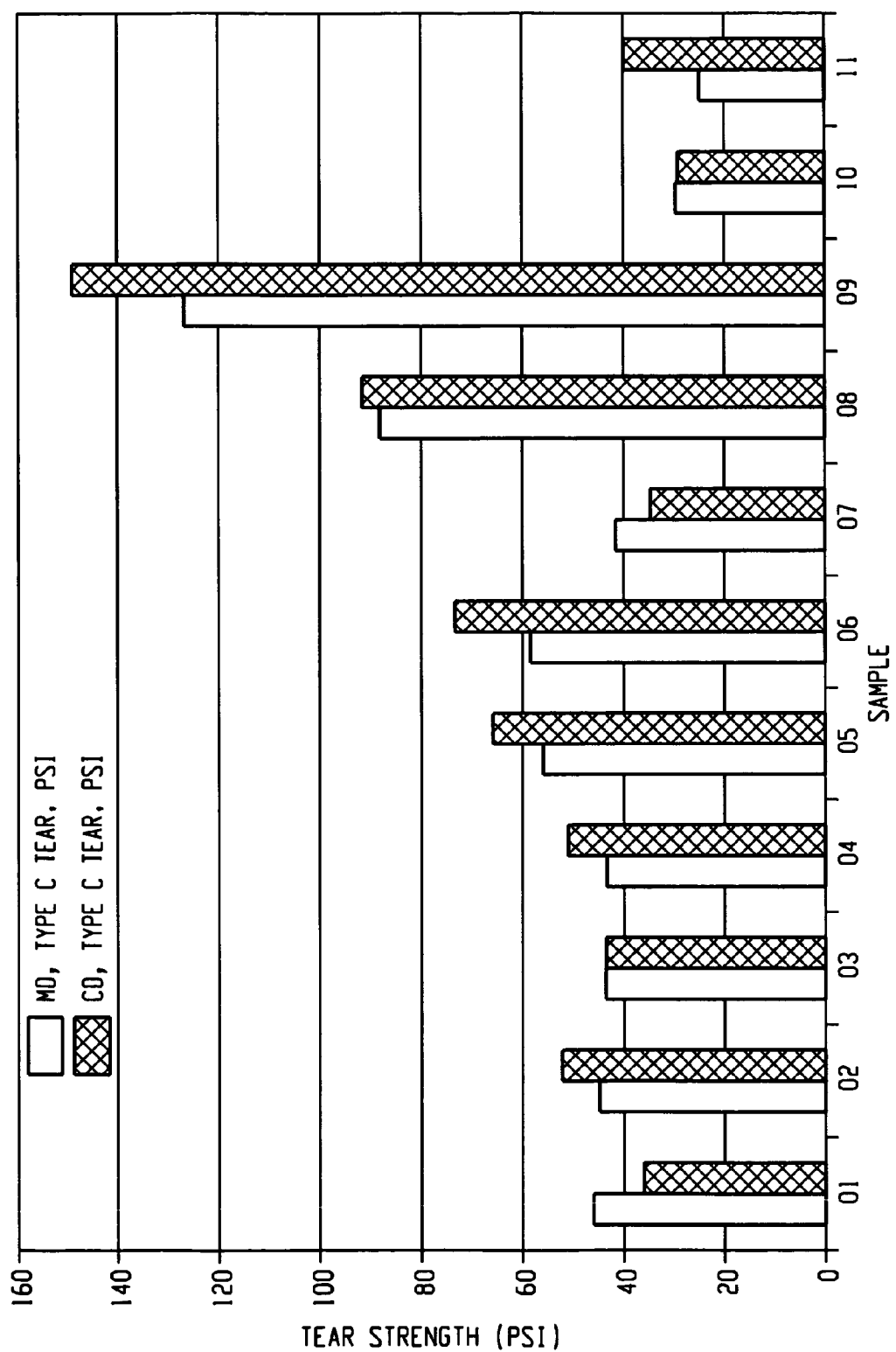
FIG. 18 provides MD, type C tear strengths (represented by the unfilled bars) and CD, Type C tear strength (represented by the filled bars) for exemplary filled polymer compositions of Examples 24, 25, 26 and 27 and Controls 5, 6, 6a, 7, 8, 9 and 10.
Figure 19:
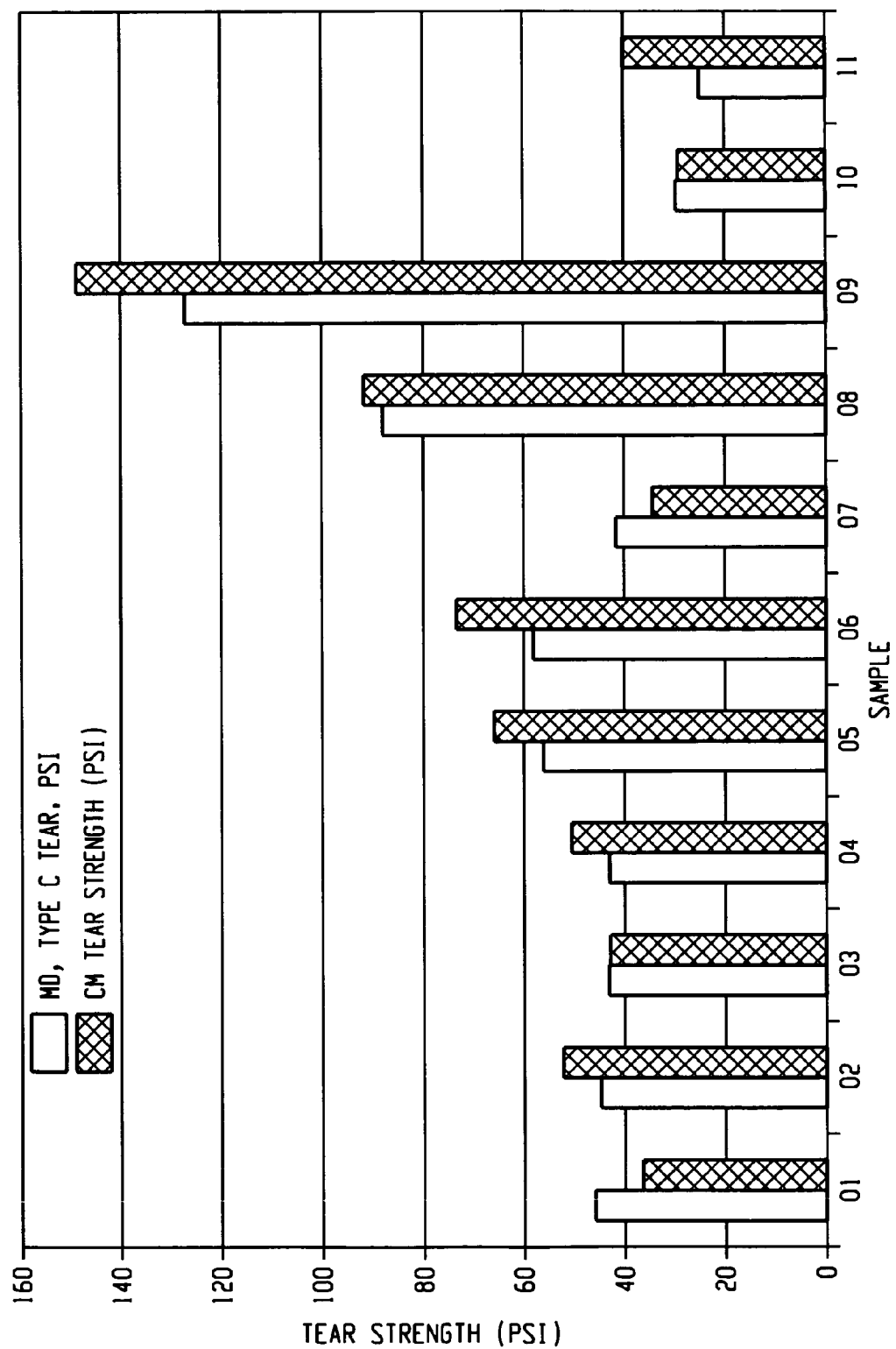
FIG. 19 provides MD, type C tear strengths (represented by the unfilled bars) and CM tear strength (represented by the filled bars) for exemplary filled polymer compositions of Examples 24, 25, 26 and 27 and Controls 5, 6, 6a, 7, 8, 9 and 10.

The tear strength and elongation of some exemplary filled polymer compositions were measured according to ASTM D 624, which is incorporated herein by reference. The tear strength and elongation results exemplary filled polymer compositions are shown in Table 11. and FIGS. 18-19.

Figure 20:
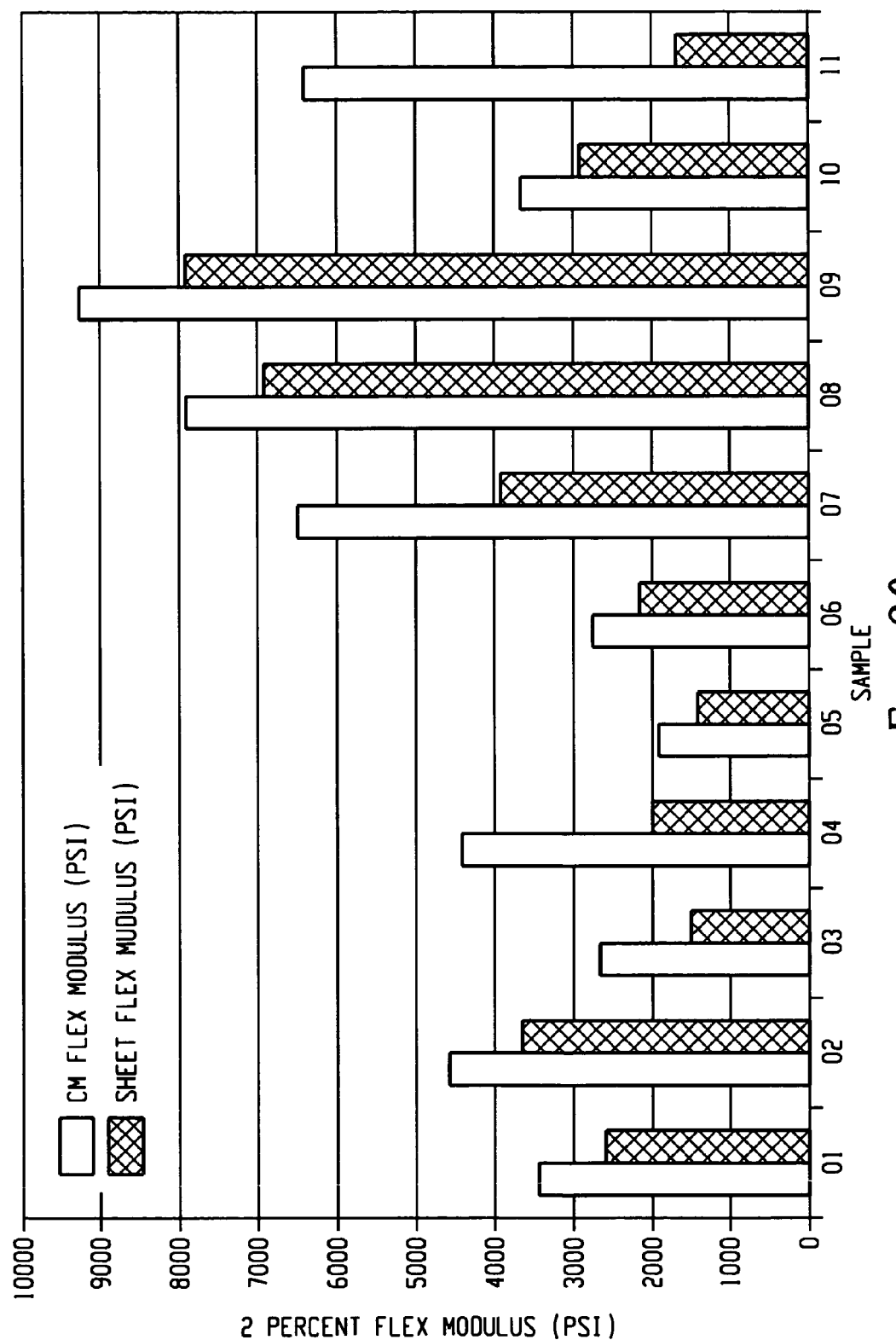
FIG. 20 provides CM flex modulus (represented by the unfilled bars) and sheet flex modulus (represented by the filled bars) for exemplary filled polymer compositions of Examples 24, 25, 26 and 27 and Controls 5, 6, 6a, 7, 8, 9 and 10.
Figure 21:
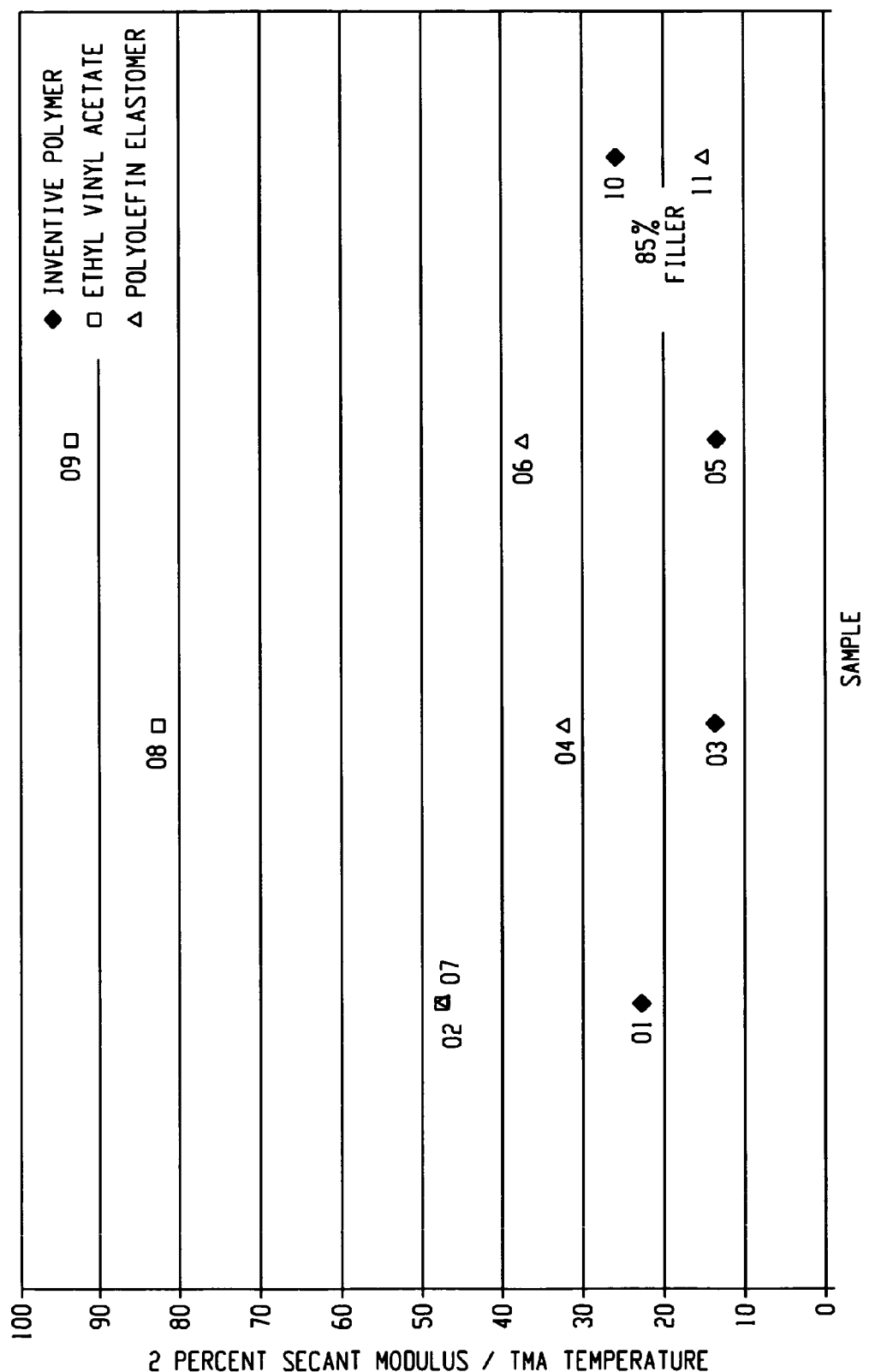
FIG. 21 provides ratios of 2% secant modulus/TMA temperature for exemplary filled polymer compositions of Examples 24, 25, 26 and 27 and Controls 5, 6, 6a, 7, 8, 9 and 10.
Figure 22:
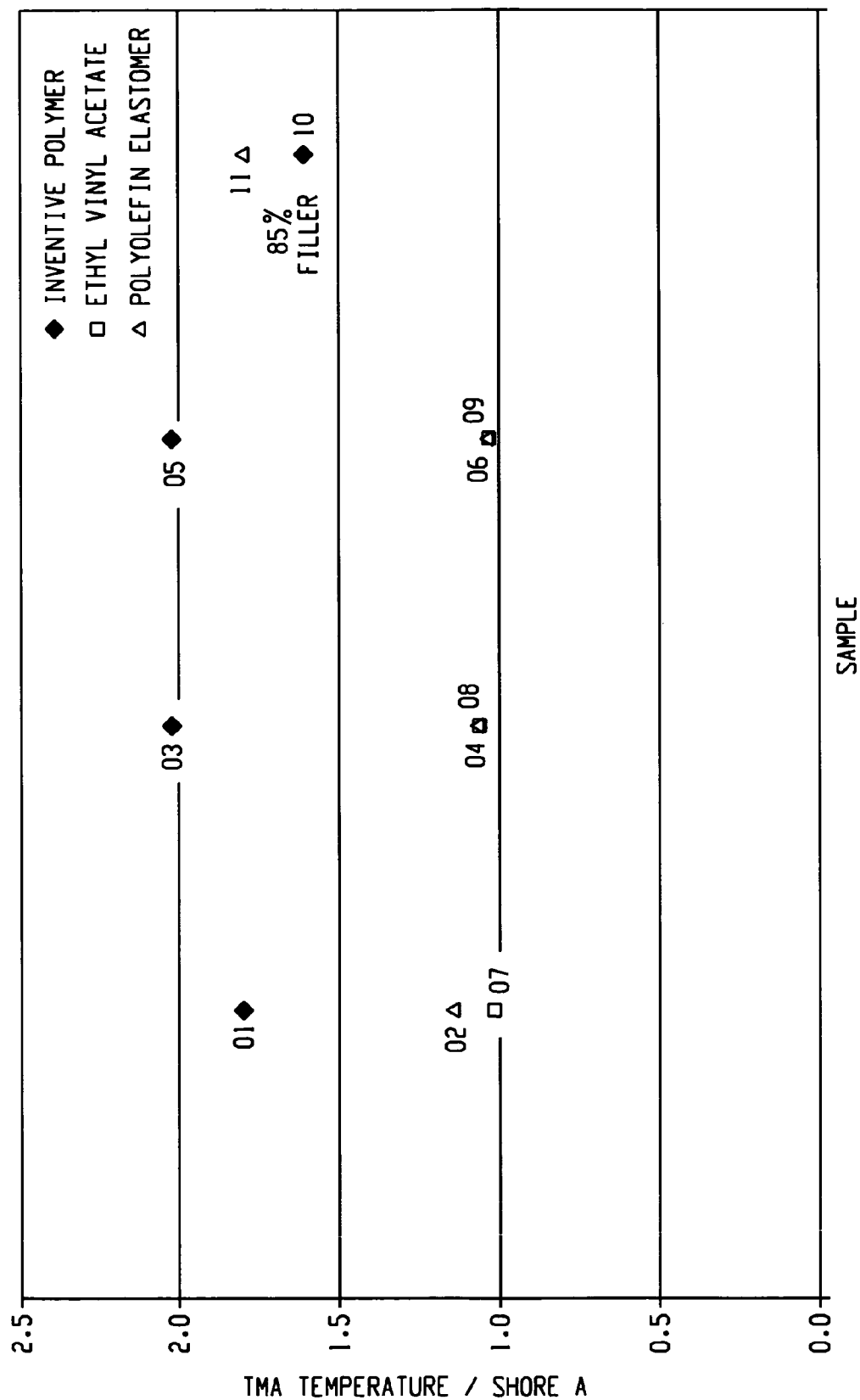
FIG. 22 provides ratios of TMA temperature/sheet hardness [Shore A] for exemplary filled polymer compositions of Examples 24, 25, 26 and 27 and Controls 5, 6, 6a, 7, 8, 9 and 10.
Figure 23:
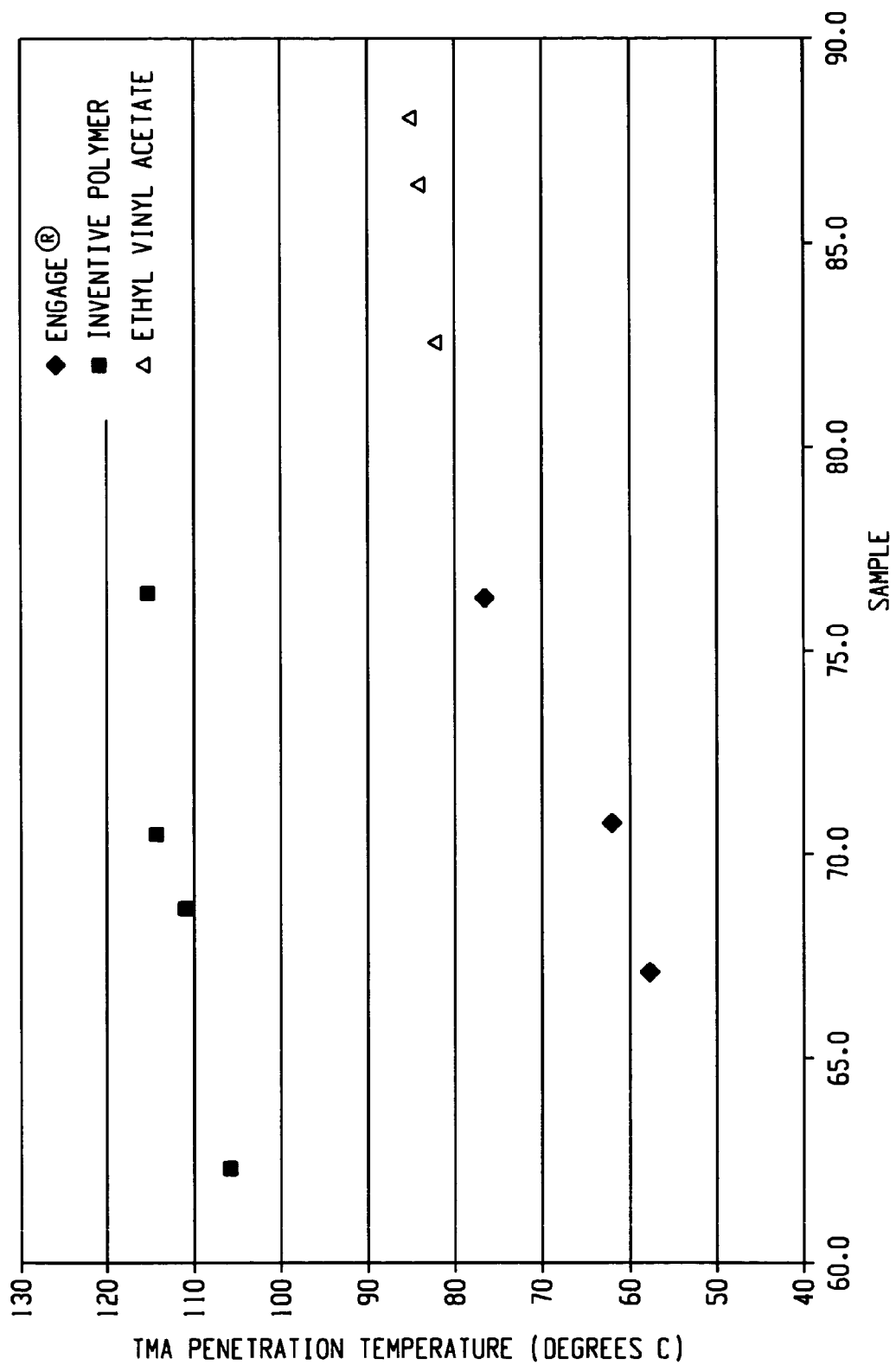
FIG. 23 provides plot of TMA penetration temperature vs durometer Hardness for exemplary filled polymer compositions. The squares represent filled compositions comprising inventive ethylene/butene copolymers; and the circles represent inventive ethylene/octene copolymers.

The flexural properties of some exemplary filled polymer compositions was measured according to ASTM D790, which is incorporated herein by reference. The results of flexural property testing exemplary filled polymer compositions are shown in Table 11 and FIG. 20.

TABLE 10

Compositions of highly formulated, filled polymer compositions of examples and reference control samples

| Components | Example 24 | Control 5 | Example 25 | Control 6 | Example 26 | Control 7 | Control 6a | Control 8 | Control 9 | Example 27 | Control 10 |
|---|---|---|---|---|---|---|---|---|---|---|---|
| Interpolymer Ex. 19d (5MI, 0.877 g/cc) | 12 | | | | | | | | | | |
| Engage ® 8452 (3MI, 0.875 g/cc) | | 12 | | | | | | | | | |
| Interpolymer Ex. 19h (1MI, 0.865 g/cc) | | | 12 | | 22.03 | | | | | 7 | |
| ENR 7467 (1MI, 0.857 g/cc) | | | | 12 | | 22.03 | | | | | 7 |
| Elvax ® 460 | | | | | | | 12 | 22.03 | 32.31 | | |
| PW8 | 80.25 | 80.25 | 80.25 | 80.25 | 70.25 | 70.25 | 80.25 | 70.25 | 60 | 85.24 | 85.24 |
| Paralux 6001 | 6.5 | 6.5 | 6.5 | 6.5 | 6.5 | 6.5 | 6.5 | 6.5 | 6.5 | 6.5 | 6.5 |
| Stearic acid | 0.25 | 0.25 | 0.25 | 0.25 | 0.22 | 0.22 | 0.25 | 0.22 | 0.19 | 0.26 | 0.26 |
| Pigment | 1 | 1 | 1 | 1 | 1 | 1 | 1 | 1 | 1 | 1 | 1 |

TABLE 11

Properties of highly formulated, filled polymer compositions of examples and reference control samples

| Property | Example 24 | Control 5 | Example 25 | Control 6 | Example 26 | Control 7 | Control 6a | Control 8 | Control 9 | Example 27 | Control 10 |
|---|---|---|---|---|---|---|---|---|---|---|---|
| Rheology 150 C., 15% Strain | | | | | | | | | | | |
| V.1, Poise | 151850 | 167860 | 399500 | 293610 | 310220 | 297520 | 237890 | 171380 | 167530 | 702200 | 1720400 |
| V10, Poise | 34506 | 36969 | 62761 | 78377 | 105960 | 124120 | 32071 | 37509 | 36948 | 58712 | 84222 |
| V100, Poise | 12928 | 12402 | 16086 | 19729 | 27993 | 34900 | 9837 | 11156 | 10885 | 15229 | 23684 |
| TanD @ 1.58 | 8.36 | 5.70 | 3.88 | 5.86 | 4.28 | 5.23 | 2.85 | 2.24 | 1.84 | 3.69 | 4.27 |
| Density N-A D792 | | | | | | | | | | | |
| CM Density [g/cc] | 1.864 | 1.918 | 1.844 | 1.886 | 1.655 | 1.651 | 1.876 | 1.734 | 1.541 | 2.057 | 2.074 |
| Sheet Density [g/cc] | 1.880 | 1.830 | 1.887 | 1.820 | 1.629 | 1.580 | 1.834 | 1.632 | 1.423 | 2.032 | 1.952 |
| Compression Set | | | | | | | | | | | |
| CSET 23 C. 25% 22 hrs | 59.2 | 38.2 | 71.3 | 70.4 | 32.7 | 41.0 | 68.5 | 53.5 | 40.0 | 85.2 | 56.3 |
| CSET 80 C. 25% 22 hrs | 94.3 | 91.2 | 109.1 | 114.3 | 80.3 | 104.9 | 110.2 | 100.8 | 99.5 | 87.8 | 97.8 |
| Shore A Hardness D2240 | | | | | | | | | | | |
| CM Hardness ShA 10 s | 61.5 | 72.5 | 63.5 | 66.0 | 57.4 | 61.7 | 81.0 | 85.1 | 86.1 | 68.7 | 79.3 |
| Sheet Hardness ShA 10 s | 63.2 | 67.2 | 54.9 | 57.5 | 52.5 | 55.3 | 80.8 | 77.3 | 81.5 | 71.4 | 66.1 |
| CM Hardness ShA 1 s | 70.5 | 76.3 | 68.7 | 70.8 | 62.3 | 67.1 | 82.6 | 86.5 | 88.1 | 76.4 | 85.4 |
| Sheet Hardness ShA 1 s | 67.1 | 71.4 | 59.4 | 61.6 | 57.5 | 59.1 | 82.8 | 78.7 | 84.2 | 75.6 | 72.0 |
| CM TMA, 5 C./min 1N | | | | | | | | | | | |
| Depth @ Transition, um | −581 | −634 | −581 | −605 | −520 | −587 | −673 | −658 | −638 | −479 | −685 |
| Temp @ Transition, C. | 85.8 | 66.7 | 66.4 | 49.3 | 57.6 | 46.9 | 75 | 77.2 | 77.4 | 85.2 | 61.8 |
| CM, Temp @ −900 um, C. | 113.9 | 76.8 | 110.8 | 61.9 | 105.7 | 57.6 | 82 | 83.9 | 84.9 | 114.9 | 118.5 |
| 60 C. Tensile, D412C 20" min MD | | | | | | | | | | | |
| MD Sheet Ten@Brk, PSI | 75 | 38 | | | | | 75 | | | 70.9 | 42.8 |
| MD Sheet Ult.Elong, % | 21 | 41 | | | | | 8 | | | 27.6 | 27.9 |
| Toughness, in · lb Modulus, PSI | 1045 | 620 | | | | | 1640 | | | 644 | 345 |
| 100% Mod, PSI | | | | | | | | | | | |
| 60 C. Tensile, D412C 20" min CD | | | | | | | | | | | |
| CD Ten@Brk, PSI | 65 | 38 | | | | | 63 | | | 55.5 | 36.191 |
| CD Ult.Elong, % | 17 | 42 | | | | | 8.8 | | | 15.5 | 27.5811 |
| Toughness, in-lb Modulus, PSI | 1000 | 890 | | | | | 1400 | | | 740 | 360 |
| 100% Mod, PSI | | | | | | | | | | | |
| Sheet Tensile, D412C 20" min MD | | | | | | | | | | | |
| MD Sheet Ten@Brk, PSI | 85.3 | 155.6 | 68.6 | 85.4 | 137.9 | 228.2 | 163.6 | 247.5 | 424.8 | 85.5 | 91.5 |

TABLE 11-continued

Properties of highly formulated, filled polymer compositions of examples and reference control samples

| Property | Example 24 | Control 5 | Example 25 | Control 6 | Example 26 | Control 7 | Control 6a | Control 8 | Control 9 | Example 27 | Control 10 |
|---|---|---|---|---|---|---|---|---|---|---|---|
| MD Sheet Ult.Elong, % | 72.9 | 586.2 | 146.2 | 833.2 | 672.9 | 1152.7 | 18.5 | 119.0 | 301.6 | 46.5 | 6.1 |
| Toughness, in · lb | 1.6 | 14.5 | 2.9 | 14.2 | 16.3 | 33.1 | 0.6 | 7.9 | 29.2 | 1.1 | 0.1 |
| Modulus, PSI | 56,665 | 550,866 | 121,824 | 43,826 | 12,857 | 4,116 | 148,530 | 38,575 | 17,572 | 9,318 | 10,760 |
| 100% Mod, PSI | 29.2 | 109.6 | 63.5 | 76.1 | 103.2 | 108.6 | | 147.8 | 352.2 | 0.7 | |
| Sheet Tensile, D412C 20" min CD | | | | | | | | | | | |
| CD Ten@Brk, PSI | 69.9 | 163.0 | 81.9 | 101.0 | 197.3 | 188.1 | 114.4 | 222.8 | 408.5 | 104.7 | 103.5 |
| CD Ult.Elong, % | 221.3 | 707.7 | 853.1 | 1045.5 | 1111.7 | 991.3 | 27.7 | 93.2 | 363.9 | 40.3 | 3.1 |
| Toughness, in-lb | 4.5 | 16.6 | 15.0 | 17.1 | 30.0 | 30.1 | 0.7 | 5.7 | 36.0 | 0.8 | 0.1 |
| Modulus, PSI | 60,809 | 11,010 | 9,799 | 27,957 | 3,873 | 4,318 | 270,096 | 188,120 | 16,979 | 244,201 | 160,154 |
| 100% Mod, PSI | 76.3 | 99.6 | 75.0 | 80.3 | 101.3 | 103.2 | | 106.8 | 339.9 | 30.4 | |
| CM Tensile, D412C 20"/min | | | | | | | | | | | |
| Thickness, in. | 0.1 | 0.1 | 0.1 | 0.1 | 0.1 | 0.1 | 0.1 | 0.1 | 0.1 | 0.1 | 0.1 |
| CM Ten@Brk, PSI | 85.7 | 133.7 | 67.6 | 98.6 | 235.8 | 238.6 | 170.9 | 329.2 | 590.6 | 122.6 | 163.5 |
| CM Ult.Elong, % | 50.5 | 567.6 | 389.6 | 114.5 | 1325.2 | 1205.1 | 6.8 | 423.7 | 579.6 | 14.3 | 1.4 |
| Toughness, in · lb | 1.1 | 12.5 | 5.5 | 2.2 | 34.3 | 37.1 | 0.2 | 19.7 | 43.0 | 0.3 | 0.0 |
| Modulus, PSI | 113,002 | 75,917 | 42,464 | 51,259 | 6,432 | 4,679 | 98,835 | 12,712 | 10,448 | 333,900 | 244,260 |
| 100% Mod, PSI | | 98.8 | 77.2 | 26.1 | 119.6 | 122.2 | | 252.2 | 364.4 | | |
| Sheet-Type C Tear D624 MD | | | | | | | | | | | |
| MD, Type C Tear, PLI | 46.1 | 44.7 | 43.9 | 43.4 | 56.0 | 58.4 | 41.8 | 88.1 | 127.4 | 30.1 | 25.1 |
| T Energy [in-Lbs] | 4.9 | 6.4 | 9.2 | 6.9 | 41.0 | 33.6 | 1.4 | 10.6 | 20.0 | 2.1 | 1.5 |
| Sheet-Type C Tear D624 CD | | | | | | | | | | | |
| CD, Type C Tear, PLI | 51.6 | 39.4 | 48.8 | 42.2 | 60.0 | 59.1 | 35.7 | 76.1 | 132.6 | 33.8 | 19.8 |
| T Energy [in-Lbs] | 7.8 | 6.7 | 9.8 | 5.7 | 31.9 | 27.0 | 2.2 | 8.0 | 20.2 | 2.3 | 1.3 |
| CM Type C Tear D624 | | | | | | | | | | | |
| CM Tr Streng.[PLI] | 36.1 | 52.1 | 43.8 | 50.9 | 66.2 | 73.3 | 34.6 | 91.8 | 148.9 | 29.3 | 39.9 |
| T Energy [in-Lbs] | 2.2 | 6.1 | 6.7 | 6.0 | 21.2 | 18.5 | 1.9 | 7.1 | 13.9 | 1.8 | 1.0 |
| CM 3-Point Flex D790 | | | | | | | | | | | |
| CM Flex Modulus [PSI] | 3622 | 5728 | 1952 | 8293 | 1018 | 2944 | 21116 | 18617 | 14367 | 16330 | 16421 |
| 1% Secant Modulus [PSI] | 3940 | 4835 | 3019 | 4967 | 2189 | 2947 | 7840 | 9189 | 10633 | 4238 | 7657 |
| 2% Secant Modulus [PSI] | 3459 | 4574 | 2654 | 4438 | 1939 | 2754 | 6493 | 7906 | 9293 | 3670 | 6413 |
| Sheet 3-Point Flex D790 | | | | | | | | | | | |
| Sheet Flex Modulus [PSI] | 6574 | 7601 | — | 1961 | 631 | — | 3983 | 12508 | 11759 | 11034 | 47825 |
| 1% Secant Modulus [PSI] | 3079 | 4284 | 1755 | 2154 | 1463 | 2111 | 3961 | 8068 | 9195 | 3547 | 3347 |
| 2% Secant Modulus [PSI] | 2607 | 3646 | 1523 | 2001 | 1420 | 2152 | 3928 | 6947 | 7930 | 2935 | 1703 |

TABLE 12

Protocol for the synthesis of the exemplary and comparative filled polymer compositions

| Sample No. | Material | PHR | SP.GR. | Volume | Vol % | Grams | Actual | Wt % |
|---|---|---|---|---|---|---|---|---|
| Example 24 | Interpolymer Ex, 19d (5MI, 0.877 g/cc) | 12 | 0.877 | 13.68 | 26.30% | 235.87 | 235.90 | 12.00% |
| | PW8 | 80.25 | 2.71 | 29.61 | 56.93% | 1577.41 | 1577.40 | 80.25% |
| | Paralux 6001 | 6.5 | 0.87 | 7.47 | 14.36% | 127.76 | 127.71 | 6.50% |
| | Stearic acid | 0.25 | 1 | 0.25 | 0.48% | 4.91 | 4.92 | 0.25% |
| | Pigment | 1 | 1 | 1.00 | 1.92% | 19.66 | 19.66 | 1.00% |
| | | 100.00 | | 52.02 | | | | |
| Control 5 | Engage ® 8452 | 12 | 0.875 | 13.71 | 26.35% | 235.73 | 235.70 | 12.00% |
| | PW8 | 80.25 | 2.71 | 29.61 | 56.89% | 1576.46 | 1576.50 | 80.25% |
| | Paralux 6001 | 6.5 | 0.87 | 7.47 | 14.36% | 127.69 | 127.64 | 6.50% |

TABLE 12-continued

Protocol for the synthesis of the exemplary and comparative filled polymer compositions

| Sample No. | Material | PHR | SP.GR. | Volume | Vol % | Grams | Actual | Wt % |
|---|---|---|---|---|---|---|---|---|
| | Stearic acid | 0.25 | 1 | 0.25 | 0.48% | 4.91 | 4.91 | 0.25% |
| | Pigment | 1 | 1 | 1.00 | 1.92% | 19.66 | 19.63 | 1.00% |
| | | 100.00 | | 52.05 | | | | |
| Example 25 | Interpolymer Ex, 19h (1 MI, 0.865 g/cc) | 12 | 0.865 | 13.87 | 26.57% | 235.02 | 235.00 | 12.00% |
| | PW8 | 80.25 | 2.71 | 29.61 | 56.72% | 1571.67 | 1571.70 | 80.25% |
| | Paralux 6001 | 6.5 | 0.87 | 7.47 | 14.31% | 127.30 | 127.33 | 6.50% |
| | Stearic acid | 0.25 | 1 | 0.25 | 0.48% | 4.90 | 4.90 | 0.25% |
| | Pigment | 1 | 1 | 1.00 | 1.92% | 19.66 | 19.65 | 1.00% |
| | | 100.00 | | 52.21 | | | | |
| Control 6 | ENR 7467 | 12 | 0.865 | 13.87 | 26.57% | 235.02 | 235.00 | 12.00% |
| | PW8 | 80.25 | 2.71 | 29.61 | 56.72% | 1571.67 | 1571.70 | 80.25% |
| | Paralux 6001 | 6.5 | 0.87 | 7.47 | 14.31% | 127.30 | 127.30 | 6.50% |
| | Stearic acid | 0.25 | 1 | 0.25 | 0.48% | 4.90 | 4.90 | 0.25% |
| | Pigment | 1 | 1 | 1.00 | 1.92% | 19.66 | 19.66 | 1.00% |
| | | 100.00 | | 52.21 | | | | |
| Example 26 | Interpolymer Ex, 19h (1 MI, 0.865 g/cc) | 22.03 | 0.865 | 25.47 | 42.39% | 374.90 | 374.90 | 22.03% |
| | PW8 | 70.25 | 2.71 | 25.92 | 43.15% | 1195.49 | 1195.50 | 70.25% |
| | Paralux 6001 | 6.5 | 0.87 | 7.47 | 12.44% | 110.61 | 110.62 | 6.50% |
| | Stearic acid | 0.22 | 1 | 0.22 | 0.37% | 3.74 | 3.76 | 0.22% |
| | Pigment | 1 | 1 | 1.00 | 1.92% | 19.66 | 19.68 | 1.00% |
| | | 100.00 | | 60.08 | | | | |
| Control 7 | ENR 7467 | 22.03 | 0.865 | 25.47 | 42.39% | 374.90 | 374.90 | 22.03% |
| | PW8 | 70.25 | 2.71 | 25.92 | 43.15% | 1195.49 | 1195.50 | 70.25% |
| | Paralux 6001 | 6.5 | 0.87 | 7.47 | 12.44% | 110.61 | 110.60 | 6.50% |
| | Stearic acid | 0.22 | 1 | 0.22 | 0.37% | 3.74 | 3.76 | 0.22% |
| | Pigment | 1 | 1 | 1.00 | 1.92% | 19.66 | 19.64 | 1.00% |
| | | 100.00 | | 60.08 | | | | |
| Control 6a | Elvax ® 460 | 12 | 0.941 | 12.75 | 24.96% | 240.17 | 240.20 | 12.00% |
| | PW8 | 80.25 | 2.71 | 29.61 | 57.97% | 1606.14 | 1606.10 | 80.25% |
| | Paralux 6001 | 6.5 | 0.87 | 7.47 | 14.62% | 130.09 | 130.08 | 6.50% |
| | Stearic acid | 0.25 | 1 | 0.25 | 0.49% | 5.00 | 5.01 | 0.25% |
| | Pigment | 1 | 1 | 1.00 | 1.92% | 19.66 | 19.65 | 1.00% |
| | | 100.00 | | 51.09 | | | | |
| Control 8 | Elvax ® 460 | 22.03 | 0.941 | 23.41 | 40.35% | 388.19 | 388.20 | 22.03% |
| | PW8 | 70.25 | 2.71 | 25.92 | 44.67% | 1237.86 | 1237.90 | 70.25% |
| | Paralux 6001 | 6.5 | 0.87 | 7.47 | 12.88% | 114.54 | 114.55 | 6.50% |
| | Stearic acid | 0.22 | 1 | 0.22 | 0.38% | 3.88 | 3.88 | 0.22% |
| | Pigment | 1 | 1 | 1.00 | 1.92% | 19.66 | 19.66 | 1.00% |
| | | 100.00 | | 58.03 | | | | |
| Control 9 | Elvax ® 460 | 32.31 | 0.941 | 34.34 | 52.71% | 507.17 | 507.20 | 32.31% |
| | PW8 | 60 | 2.71 | 22.14 | 33.99% | 941.81 | 941.80 | 60.00% |
| | Paralux 6001 | 6.5 | 0.87 | 7.47 | 11.47% | 102.03 | 102.03 | 6.50% |
| | Stearic acid | 0.19 | 1 | 0.19 | 0.29% | 2.98 | 2.98 | 0.19% |
| | Pigment | 1 | 1 | 1.00 | 1.92% | 19.66 | 19.67 | 1.00% |
| | | 100.00 | | 65.14 | | | | |
| Example 27 | Interpolymer Ex, 19h (1 MI, 0.865 g/cc) | 7 | 0.865 | 8.09 | 16.76% | 136.85 | 136.90 | 7.00% |
| | PW8 | 85.24 | 2.71 | 31.45 | 65.15% | 1666.39 | 1666.40 | 85.24% |
| | Paralux 6001 | 6.5 | 0.87 | 7.47 | 15.48% | 127.07 | 127.06 | 6.50% |
| | Stearic acid | 0.26 | 1 | 0.26 | 0.54% | 5.08 | 5.08 | 0.26% |
| | Pigment | 1 | 1 | 1.00 | 1.92% | 19.66 | 19.67 | 1.00% |
| | | 100.00 | | 48.28 | | | | |
| Control 10 | ENR 7467 | 7 | 0.865 | 8.09 | 16.76% | 136.85 | 136.90 | 7.00% |
| | PW8 | 85.24 | 2.71 | 31.45 | 65.15% | 1666.39 | 1666.40 | 85.24% |
| | Paralux 6001 | 6.5 | 0.87 | 7.47 | 15.48% | 127.07 | 127.02 | 6.50% |
| | Stearic acid | 0.26 | 1 | 0.26 | 0.54% | 5.08 | 5.08 | 0.26% |
| | Pigment | 1 | 1 | 1.00 | 1.92% | 19.66 | 19.67 | 1.00% |
| | | 100.00 | | 48.28 | | | | |

TABLE 13

Protocol for the synthesis of the exemplary and comparative filled polymer compositions

| Sample No. | Time min | RPM | Temp ° F. | Action | Time min | RPM | Temp |
|---|---|---|---|---|---|---|---|
| Example 24 | 0 | 75 | 207.7 | Added polymer | 14 | 50 | 249.6 |
| | 2 | 30 to 75 | 210.2 | Added Stearic/1/2CaCO3/pigment | 16 | 50 | 251 |
| | 5 | 30 | 230.9 | Added Oil/1/2 CaCO3 | | | |
| | 8 | 50 | 242.3 | Sweep/Reverse | | | |
| | 10 | 50 | 255.8 | Sweep/Forward | | | |
| | 12 | 50 | 246.7 | Sweep/Reverse | | | |
| Control 5 | 0 | 75 | 215.2 | Added polymer | 14 | 50 | 261 |
| | 2 | 30 to 75 | 218.6 | Added Stearic/1/2CaCO3/pigment | 16 | 50 | 259.2 |
| | 5 | 30 to 50 | 252.3 | Added Oil/1/2 CaCO3 | | | |
| | 8 | 50 | 247.1 | Sweep/Reverse | | | |
| | 10 | 50 | 264.9 | Sweep/Forward | | | |
| | 12 | 50 | 253 | Sweep/Reverse | | | |
| Example 25 | 0 | 75 | 227.4 | Added polymer | 14 | 50 | 278.8 |
| | 2 | 30 to 75 | 232.3 | Added Stearic/1/2CaCO3/pigment | 16 | 50 | 263.3 |
| | 5 | 30 to 50 | 252 | Added Oil/1/2 CaCO3 | | | |
| | 8 | 50 | 247.2 | Sweep/Reverse | | | |
| | 10 | 50 | 270.2 | Sweep/Forward | | | |
| | 12 | 50 | 258.8 | Sweep/Reverse | | | |
| Control 6 | 0 | 75 | 230.3 | Added polymer | 14 | 50 | 278.5 |
| | 2 | 30 to 75 | 232.9 | Added Stearic/1/2CaCO3/pigment | 16 | 50 | 268.4 |
| | 5 | 30 to 75 | 246.9 | Added Oil/1/2 CaCO3 | | | |
| | | 30 to 50 | | | | | |
| | 8 | 50 | 255 | Sweep/Reverse | | | |
| | 10 | 50 | 274.4 | Sweep/Forward | | | |
| | 12 | 50 | 263.5 | Sweep/Reverse | | | |
| Example 26 | 0 | 75 | 233.7 | Added polymer | 14 | 50 | 282.6 |
| | 2 | 30 to 75 | 234 | Added Stearic/1/2CaCO3/pigment | 16 | 50 | 271.9 |
| | 5 | 30 to 50 | 270.3 | Added Oil/1/2 CaCO3 | | | |
| | 8 | 50 | 258.9 | Sweep/Reverse | | | |
| | 10 | 50 | 278.7 | Sweep/Forward | | | |
| | 12 | 50 | 269.3 | Sweep/Reverse | | | |
| Control 7 | 0 | 75 | 235.2 | Added polymer | 14 | 50 | 284.5 |
| | 2 | 30 to 75 | 246.1 | Added Stearic/1/2CaCO3/pigment | 16 | 50 | 272.5 |
| | 5 | 30 to 50 | 275.1 | Added Oil/1/2 CaCO3 | | | |
| | 8 | 50 | 265.4 | Sweep/Reverse | | | |
| | 10 | 50 | 281.5 | Sweep/Forward | | | |
| | 12 | 50 | 268.2 | Sweep/Reverse | | | |
| Control 6a | 0 | 75 | 224.6 | Added polymer | 14 | 50 | 274.8 |
| | 2 | 30 to 75 | 230.7 | Added Stearic/1/2CaCO3/pigment | 16 | 50 | 266.5 |
| | 5 | 30 to 50 | 251 | Added Oil/1/2 CaCO3 | | | |
| | 8 | 50 | 251.9 | Sweep/Reverse | | | |
| | 10 | 50 | 269.1 | Sweep/Forward | | | |
| | 12 | 50 | 269.9 | Sweep/Reverse | | | |
| Control 8 | 0 | 75 | 237.8 | Added polymer | 14 | 50 | 278.3 |
| | 2 | 30 to 75 | 246.4 | Added Stearic/1/2CaCO3/pigment | 16 | 50 | 271.5 |
| | 5 | 30 to 50 | 254.3 | Added Oil/1/2 CaCO3 | | | |
| | 8 | 50 | 257.6 | Sweep/Reverse | | | |
| | 10 | 50 | 275.3 | Sweep/Forward | | | |
| | 12 | 50 | 268.3 | Sweep/Reverse | | | |
| Control 9 | 0 | 75 | 232.2 | Added polymer | 14 | 50 | 277.8 |
| | 2 | 30 | 204.1 | Added Stearic/1/2CaCO3/pigment | 16 | 50 | 275.9 |
| | 5 | 30 to 50 | 267.7 | Added Oil/1/2 CaCO3 | | | |
| | 8 | 50 | 263.1 | Sweep/Reverse | | | |
| | 10 | 50 | 274.2 | Sweep/Forward | | | |
| | 12 | 50 | 269.8 | Sweep/Reverse | | | |
| Example 27 | 0 | 75 | 216.6 | Added polymer | 14 | 50 | 274.4 |
| | 2 | 30 to 75 | 220.1 | Added Stearic/1/2CaCO3/pigment | 16 | 50 | 259.9 |
| | 5 | 30 to 50 | 231.3 | Added Oil/1/2 CaCO3 | | | |
| | 8 | 50 | 246.9 | Sweep/Reverse | | | |
| | 10 | 50 | 268.2 | Sweep/Forward | | | |
| | 12 | 50 | 252.4 | Sweep/Reverse | | | |
| Control 10 | 0 | 75 | 230.2 | Added polymer | 14 | 50 | 275.8 |
| | 2 | 30 to 75 | 232.4 | Added Stearic/1/2CaCO3/pigment | 16 | 50 | 266.8 |
| | 5 | 30 to 50 | 249.5 | Added Oil/1/2 CaCO3 | | | |
| | 8 | 50 | 253.9 | Sweep/Reverse | | | |
| | 10 | 50 | 270.8 | Sweep/Forward | | | |
| | 12 | 50 | 263.8 | Sweep/Reverse | | | |

TABLE 14

Ratio of Modulus and Hardness to the TMA penetration temperature

| Polymer | 2% Modulus/ TMA | TMA/Sheet Hardness Shore A 10 s |
|---|---|---|
| Example 24 | 22.9 | 1.8 |
| Example 25 | 13.7 | 2.0 |
| Example 26 | 13.4 | 2.0 |
| Example 27 | 25.5 | 1.6 |
| Control 5 | 47.5 | 1.1 |
| Control 6 | 32.3 | 1.1 |
| Control 7 | 37.4 | 1.0 |
| Control 10 | 14.4 | 1.8 |
| Control 6a | 47.9 | 1.0 |
| Control 8 | 82.8 | 1.1 |
| Control 9 | 93.4 | 1.0 |

As demonstrated above, the filled polymer compositions comprising an ethylene/α-olefin interpolymer provided herein have, for example, higher heat resistance, better flexibility, and improvement in heat resistance-low modulus balance. In certain embodiments, the filled polymer compositions provided herein exhibit improved heat resistance-flexibility-processibility-filler uptake level combination; higher heat resistance; comparable or better flexibility; and comparable or better filler uptake level. Such improved properties render the compositions provided herein suitable for applications in noise vibration and harshness improvement, in automotive flooring and rooftops, in coatings for cable and wire.

Furthermore, compared with traditionally known copolymers, the new ethylene/α-olefin interpolymer provided herein exhibit higher crystallization temperatures and thus higher green strength at relatively higher temperatures. This will allow higher set-up temperatures, shorter set-up time and faster production rate in injection molding, calendaring, thermoforming and other similar types of operations. The ethylene/α-olefin interpolymer provided herein should yield lower shrinkage relative to random copolymers. Additional advantages, applications and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

The invention claimed is:

1. A filled polymer composition comprising:
(i) a polymer and
(ii) a filler,
wherein the polymer comprises an ethylene/α-olefin multi-block interpolymer comprising at least 50 mole percent ethylene that
(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m > -2002.9 + 4538.5(d) - 2422.2(d)^2; \text{ or}$$

(b) has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1.

2. The filled polymer composition of claim 1, wherein the ethylene/α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq 858.91 - 1825.3(d) + 1112.8(d)^2.$$

3. The filled polymer composition of claim 1, wherein the ethylene/α-olefin interpolymer has a $M_w/M_n$ from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identitiable CRYSTAF peak, then the CRYSTAF temperature is 30° C.

4. The filled polymer composition of claim 1, wherein the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$.

5. The filled polymer composition of claim 1, wherein the numerical values of Re and d satisfy the following relationship:

$Re > 1491 - 1629(d)$.

6. The filled polymer composition of claim 1, wherein the numerical values of Re and d satisfy the following relationship:

$Re > 1501 - 1629(d)$.

7. The filled polymer composition of claim 1, wherein the numerical values of Re and d satisfy the following relationship:

$Re > 1511 - 1629(d)$.

8. The filled polymer composition of claim 1, wherein the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

9. The filled polymer composition of claim 1, wherein the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

10. The filled polymer composition of claim 1, wherein the α-olefin is propylene, 1-butene, 1-pentene, 1-hexene, 1-octene or a combination thereof.

11. The filled polymer composition of claim 1, wherein the ethylene/α-olefin interpolymer is present in a range from about 5% to about 70% by total weight of the composition.

12. The filled polymer composition of claim 1, wherein the filler is selected from calcium carbonate, barium sulfate, aluminum hydroxide, magnesium hydroxide, glass fibers, nanoclays, talc, carbon black or graphite, flyash, cement dust, clay, feldspar, nepheline, silica or glass, fumed silica, alumina, magnesium oxide, zinc oxide, aluminum silicate, calcium silicate, titanium dioxide, titanates, glass microspheres and chalk.

13. The filled polymer composition of claim 12, wherein the filler is selected from calcium carbonate and barium sulfate.

14. The filled polymer composition of claim 13, wherein the filler is calcium carbonate.

15. The filled polymer composition of claim 12, wherein the filler is present in a range from about 30% to about 95%.

16. The filled polymer composition of claim 1, wherein the polymer further comprises a second polymer.

17. The filled polymer composition of claim 16, wherein the second polymer is selected from polyethylene, a polypropylene, a polyvinyl chloride, ethylene-propylene copolymer, a (ethylene-co-vinyl acetate), a terpolymer of ethylene, propylene, a nonconjugated diene, a mixed polymer of ethylene and vinyl acetate, a styrene-butadiene mixed polymers and a combination thereof.

18. A filled polymer composition comprising:
(i) a polymer
(ii) a filler.
  wherein the polymer comprises an ethylene/α-olefin interpolymer that
  (a) has a $M_w/M_n$ from about 1.7 to about 3.5. at least one melting point, $T_m$, in degrees Celsius, and a density, d, in grams/cubic centimeter, wherein the numerical values of $T_m$ and d correspond to the relationship:

$T_m > -2002.9 + 4538.5(d) - 2422.2(d)^2$; or (b) has a $M_w/M_n$ from about 1.7 to about 3.5, and is characterized by a heat of fusion, ΔH in J/g, and a delta quantity, ΔT. in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g.

$\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C. or
  (c) is characterized by an elastic recovery, Re, in percent at 300 percent strain and 1 cycle measured with a compression-molded film of the ethylene/α-olefin interpolymer, and has a density, d. in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
  (e) is characterized by a storage modulus at 25° C., G'(25° C.), and a storage modulus at 100° C., G'(100° C.), wherein the ratio of G'(25° C.) to G'(100° C.) is from about 1:1 to about 10:1; and
(iii) a plasticizer.

19. The filled polymer composition of claim 18, wherein the plasticizer comprises a processing oil, an epoxidized oil, a polyester, a polyether, a polyether ester or a combination thereof.

20. The filled polymer composition of claim 19, wherein the plasticizer comprises paraffinic processing oil and stearic acid.

21. The filled polymer composition of claim 18, wherein the plasticizer is a present in an amount from about 1% up to about 15%.

22. The filled polymer composition of claim 18, wherein the filler is selected from aluminum hydroxide and magnesium hydroxide.

23. The filled polymer composition of claim 1, wherein the polymer is a blend of ethylene/α-olefin copolymers.

24. A sound deadening article comprising the filled polymer composition of claim 1.

25. An automotive carpet comprising the filled polymer composition of claim 1.

26. A roofing material comprising the filled polymer composition of claim 1.

27. A wire or cable coating comprising the filled polymer composition of claim 1.

28. A floor tile comprising the filled polymer composition of claim 1.

29. A floor sheet comprising the filled polymer composition of claim 1.

30. A profile comprising the filled polymer composition of claim 1.

31. A gasket comprising the filled polymer composition of claim 1.

32. A floor mat comprising the filled polymer composition of claim 1.

33. A filled polymer composition comprising:
   (i) a polymer and
   (ii) a filler, wherein the polymer comprises an ethylene/α-olefin multi-block interpolymer comprising at least 50 mole percent ethylene that has
      (a) at least a molecular fraction which elutes between 40° C. and 130° C. when fractionated using TREF, characterized in that the fraction has a block index of at least 0.5 and up to about 1 or
      (b) an average block index greater than zero and up to about 1.0 and a molecular weight distribution, $M_w/M_n$, greater than about 1.3.

34. The filled polymer composition of claim 33, wherein the ethylene/α-olefin interpolymer has at least a molecular fraction which elutes between 40° C. and 130° C. when fractionated using TREF, characterized in that the fraction has a block index of at least 0.5 and up to about 1.

35. The filled polymer composition of claim 33, wherein the ethylene/α-olefin interpolymer has an average block index greater than zero and up to about 1.0 and a molecular weight distribution, $M_w/M_n$, greater than about 1.3.

36. The filled polymer composition of claim 33, wherein the α-olefin is propylene, 1-butene, 1-pentene, 1-hexene, 1-octene or a combination thereof.

37. The filled polymer composition of claim 33, wherein the ethylene/α-olefin interpolymer is present in a range from about 5% to about 70% by total weight of the composition.

38. The filled polymer composition of claim 33, wherein the filler is selected from calcium carbonate, barium sulfate, aluminum hydroxide, magnesium hydroxide, glass fibers, nano-clays, talc, carbon black or graphite, flyash, cement dust, clay, feldspar, nepheline, silica or glass, fumed silica, alumina, magnesium oxide, zinc oxide, aluminum silicate, calcium silicate, titanium dioxide, titanates, glass microspheres and chalk.

39. The filled polymer composition of claim 38, wherein the filler is calcium carbonate.

40. The filled polymer composition of claim 33, wherein the filler is present in a range from about 30% to about 95%.

41. The filled polymer composition of claim 33, wherein the polymer further comprises a second polymer.

42. The filled polymer composition of claim 41, wherein the second polymer is selected from polyethylene, a polypropylene, a polyvinyl chloride, ethylene-propylene copolymer, a (ethylene-co-vinyl acetate), a terpolymer of ethylene, propylene, a nonconjugated diene, a mixed polymer of ethylene and vinyl acetate, a styrene-butadiene mixed polymers and a combination thereof.

43. The filled polymer composition of claim 33, wherein the composition further comprises at least a plasticizer.

44. The filled polymer composition of claim 43, wherein the plasticizer comprises a processing oil, an epoxidized oil, a polyester, a polyether, a polyether ester or a combination thereof.

45. The filled polymer composition of claim 44, wherein the plasticizer comprises paraffinic processing oil and stearic acid.

46. The filled polymer composition of claim 43, wherein the plasticizer is a present in an amount from about 1% up to about 15%.

47. The filled polymer composition of claim 33, wherein the polymer is a blend of ethylene/α-olefin copolymers.

48. A sound deadening article comprising the filled polymer composition of claim 33.

49. An automotive carpet comprising the filled polymer composition of claim 33.

50. A roofing material comprising the filled polymer composition of claim 33.

51. A wire or cable coating comprising the filled polymer composition of claim 33.

52. A floor tile comprising the filled polymer composition of claim 33.

53. A floor sheet comprising the filled polymer composition of claim 33.

54. A profile comprising the filled polymer composition of claim 33.

55. A gasket comprising the filled polymer composition of claim 33.

56. A floor mat comprising the filled polymer composition of claim 33.

57. The filled polymer composition of claim 18, wherein the filler is selected from calcium carbonate, barium sulfate, aluminum hydroxide, magnesium hydroxide, glass fibers, nano-clays, talc, carbon black or graphite, flyash, cement dust, clay, feldspar, nepheline, silica or glass, fumed silica, alumina, magnesium oxide, zinc oxide, aluminum silicate, calcium silicate, titanium dioxide, titanates, glass microspheres and chalk.

58. The filled polymer composition of claim 18, wherein the filler is selected from calcium carbonate and barium sulfate.

* * * * *